(12) United States Patent
Kim et al.

(10) Patent No.: US 11,354,854 B2
(45) Date of Patent: Jun. 7, 2022

(54) METHOD OF REMOVING OUTLIER OF POINT CLOUD AND APPARATUS IMPLEMENTING THE SAME

(71) Applicant: ELECTRONICS AND TELECOMMUNICATIONS RESEARCH INSTITUTE, Daejeon (KR)

(72) Inventors: Hyun Cheol Kim, Sejong-si (KR); Hyuk Min Kwon, Daejeon (KR); Jeong Il Seo, Daejeon (KR); Sang Woo Ahn, Daejeon (KR); Seung Jun Yang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/171,466

(22) Filed: Feb. 9, 2021

(65) Prior Publication Data

US 2021/0248815 A1 Aug. 12, 2021

(30) Foreign Application Priority Data

Feb. 11, 2020 (KR) .................. 10-2020-0016150

(51) Int. Cl.
*G09G 5/00* (2006.01)
*G06T 17/00* (2006.01)
*G06F 17/18* (2006.01)

(52) U.S. Cl.
CPC .............. *G06T 17/00* (2013.01); *G06F 17/18* (2013.01)

(58) Field of Classification Search
CPC ... G06T 2207/10028; G06T 7/12; G06T 7/50; G06T 17/00; G06T 17/05; G06T 2210/56; G06T 7/521; G06F 17/18
See application file for complete search history.

(56) References Cited

U.S. PATENT DOCUMENTS

| 9,234,964 B2 | 1/2016 | Mheen et al. |
| 9,857,472 B2 | 1/2018 | Mheen et al. |

(Continued)

FOREIGN PATENT DOCUMENTS

| KR | 2000-0072812 | 12/2000 |
| KR | 10-2013-0021018 | 3/2013 |

(Continued)

*Primary Examiner* — Hau H Nguyen
(74) *Attorney, Agent, or Firm* — Kile Park Reed & Houtteman PLLC

(57) ABSTRACT

Disclosed herein a method of removing a point cloud outlier and an apparatus implementing the method. The method includes: arranging a point cloud obtained from a laser scanner along at least a first direction; selecting, neighboring first-axis points, between which a separation degree satisfies an inspection start threshold condition, as a first leading-side representative point and a first trailing-side representative point; selecting a first leading-side outlier candidate and a first trailing-side outlier candidate based on a first leading-side separation degree and a first trailing-side separation degree; and determining the first leading-side outlier candidate and the first trailing-side outlier candidate as a first outlier point, when the number of the outlier candidates satisfies an allowable threshold condition.

16 Claims, 18 Drawing Sheets

(56) References Cited

U.S. PATENT DOCUMENTS

2015/0009301 A1* 1/2015 Ribnick .................. G06T 7/571
  348/50
2020/0111251 A1* 4/2020 Shi ....................... G06K 9/6284

FOREIGN PATENT DOCUMENTS

| KR | 10-2015-0051854 | 5/2015 |
| KR | 10-1549155 | 10/2015 |

* cited by examiner

METHOD OF REMOVING OUTLIER OF POINT CLOUD AND APPARATUS IMPLEMENTING THE SAME

CROSS REFERENCE TO RELATED APPLICATION

The present application claims priority to Korean Patent Application No. 10-2020-0016150, filed Feb. 11, 2020, the entire contents of which are incorporated herein for all purposes by this reference.

BACKGROUND OF THE INVENTION

Field of the Invention

The present disclosure relates to a method of removing a point cloud outlier and an apparatus implementing the method. Particularly, the present disclosure relates to a method of removing an outlier of edge, which is generated when a point cloud is obtained by a laser scanner, and an apparatus implementing the method.

DESCRIPTION OF THE RELATED ART

One of the methods for acquiring spatial information of an object is obtaining point clouds by means of a laser scanner. When a laser scanner is used, a distance is calculated by measuring a time or topology for a laser transmitted to return after being reflected from an object, and spatial information is configured as a result. Generally, a laser scanner obtains spatial information for an object by rotating a mirror and thus transmitting a laser in multiple directions. However, there is a problem that an area of laser transmitted and received by a laser scanner makes accurate measurement at an edge of an object.

When a laser is irradiated to an edge, a portion of the laser is reflected from the edge and another portion is reflected from an object behind the edge, which results in an accurate calculation of distance. As a laser beam has an oval shape, it is divided into two parts at an edge and illumination at this point is estimated to be a weighted average of illumination reflected from two surface.

Moreover, 3D laser scanning equipment increases a range of point cloud acquisition through rotation. When obtaining a high-resolution point cloud, a moving range according to a unit angle of rotation is smaller than a diameter of a laser and thus the laser collides with an edge multiple times. In this case, a plurality of outliers appears due to the edge.

FIG. 1 is an example case in which a laser beam 12 transmitted from a 3D laser scanner successively turns round in the vertical direction as it moves to the right. From the left, the first and second examples are cases in which the laser beam 12 is reflected from a surface 16 not an edge 14. The third to fifth examples are cases in which the laser beam 12 is reflected from the edge. The sixth and seventh examples are cases in which the laser beam 12 is reflected from an object existing behind the edge 14. A point cloud obtained in FIG. 1 is located between the edge 14 and the object behind the edge 14 by a laser that is reflected from the object and received. This may be confirmed in FIG. 2 showing an image of point cloud including an outlier.

As a 3D laser scanner rotates not only in the vertical direction but also in the horizontal direction, the occurrence of outlier at vertical scanning is repeatedly shown along the vertical direction.

One of the conventional outlier removal methods for solving the above-described problem is determining a point as an outlier when there are not more than a certain number of points within a predetermined region. Although this method removes many low-density outliers, low density normal points are also removed or high-density outliers cannot still be removed.

SUMMARY OF THE INVENTION

A technical object of the present disclosure is to provide a point cloud outlier removal method, which accurately determines an outlier of a point cloud generated near an edge of an object and removes the outlier, and an apparatus implementing the method.

The technical objects of the present disclosure are not limited to the above-mentioned technical object, and other technical objects that are not mentioned will be clearly understood by those skilled in the art through the following descriptions.

According to the present disclosure, there is provided a method of removing outlier of point cloud, the method comprising: arranging a point cloud obtained from a laser scanner in a shape that is placed at least along a first direction; selecting, among neighboring first-axis points along a first axis parallel to the first direction, neighboring first-axis points, between which a separation degree satisfies an inspection start threshold condition, as a first leading-side representative point and a first trailing-side representative point; selecting a first leading-side outlier candidate and a first trailing-side outlier candidate based on a first leading-side separation degree and a first trailing-side separation degree, the first leading-side separation degree being calculated between neighboring first-axis points among the first leading-side representative point and first-axis points which are arranged in front of the first leading-side representative point along the first axis, the first trailing-side separation degree being calculated between neighboring first-axis points among the first trailing-side representative point and first-axis points which are arranged behind the first trailing-side representative point along the first axis; and determining the first leading-side outlier candidate and the first trailing-side outlier candidate as a first outlier point, when the number of the outlier candidates satisfies an allowable threshold condition.

According to the embodiment of the present disclosure, the separation degree, the first leading-side separation degree and the first trailing-side separation degree may be calculated based on a distance between the neighboring first-axis points or, an angle that is measured by employing a point placed in front among the neighboring first-axis points in the first axis as a central point, the angle being an angle between the neighboring first-axis points and the laser scanner.

According to the embodiment of the present disclosure, the inspection start threshold condition may be specified as a condition that the separation degree is larger than a predetermined start angle or smaller than a supplementary angle of the start angle, when the separation degree is based on the angle, and the start angle may be set to be larger than the supplementary angle.

According to the embodiment of the present disclosure, in a case that the first leading-side separation degree and the first trailing-side separation degree are based on the angle, the selecting of an outlier candidate may select the central point as an outlier candidate when the first leading-side separation degree and the first trailing-side separation degree do not satisfy an inspection end threshold condition, and the inspection end threshold condition may be specified as a condition that the first leading-side separation degree and the first trailing-side separation degree are smaller than a predetermined end angle or larger than a supplementary angle of the end angle, and the end angle is set to be larger than the supplementary angle.

According to the embodiment of the present disclosure, the selecting of the outlier candidate may stop at the first-axis point corresponding to the inspection end threshold condition, when the first leading-side separation degree and the first trailing-side separation degree satisfy the inspection end threshold condition.

According to the embodiment of the present disclosure, the determining as the first outlier point may determine the outlier candidates as a normal point, when the number of the outlier candidates does not satisfy an allowable threshold condition.

According to the embodiment of the present disclosure, the allowable threshold condition may be set based on a size of a laser beam at a transmitting point of the laser scanner, an emitting angle of the laser beam, a measured distance between an object, to which the laser beam is irradiated, and the laser scanner, a unit travel distance of the laser beam at the measured distance, and a placement angle of the object according to a direction in which the laser beam moves.

According to the embodiment of the present disclosure, the selecting as the first leading-side representative point and the first trailing-side representative point may calculate each separation degree between the neighboring first-axis points in sequence by moving from an inspection start point of the first axis towards the rear of the first axis and selecting neighboring first-axis points, which first satisfy the inspection start threshold condition in each calculated separation degree, as the first leading-side representative point and the first trailing-side representative point.

According to the embodiment of the present disclosure, the selecting as the first leading-side representative point and the first trailing-side representative point may employ a first-axis point placed behind an outlier candidate, which is placed last among the first trailing-side outlier candidates for which, in the determining as the first outlier point, it is determined whether or not an allowable threshold condition is satisfied, as an inspection start point, when the determining as the first outlier point is not implemented up to an end point of the first axis, and may calculate a separation degree in sequence from the first-axis point that is employed as the inspection start point towards the rear of the first axis, and may select a new first leading-side representative point and a new first trailing-side representative point.

According to the embodiment of the present disclosure, the selecting of the first leading-side outlier candidate in the selecting of the outlier candidate may calculates a first leading-side separation degree between the neighboring first-axis points by moving in sequence from the new first leading-side representative point towards a front of the first axis, and the selecting of the first-side outlier candidate may stop at the first-axis point corresponding to the inspection end threshold condition, when the first leading-side separation degree satisfies an inspection end threshold condition behind the inspection start point.

According to the embodiment of the present disclosure, the laser scanner may generate two-dimensional or three-dimensional spatial information.

According to the embodiment of the present disclosure, for the first-axis points of each of the layers, the selecting as the first leading-side representative point and the first trailing-side representative point, the selecting of the first leading-side outlier candidate and the first trailing-side outlier candidate and the determining as the first outlier point may be repeated, when the laser scanner generates three-dimensional spatial information and the point cloud is generated in a plurality of layers in a second direction different from the first direction.

According to the embodiment of the present disclosure, the arranging of the point cloud further may generate a shape that is arranged along a second direction different from the first direction when the laser scanner generates three-dimensional spatial information, and further may comprises: selecting, among second-axis points along a second axis parallel to the second direction, neighboring second-axis points, between which a separation degree satisfies an inspection start threshold condition, as a second leading-side representative point and a second trailing-side representative point; selecting a second leading-side outlier candidate and a second trailing-side outlier candidate based on a second leading-side separation degree and a second trailing-side separation degree, the second leading-side separation degree being calculated between neighboring second-axis points among the second leading-side representative point and second-axis points which are arranged in front of the second leading-side representative point along the second axis, the second trailing-side separation degree being calculated between neighboring second-axis points among the second trailing-side representative point and second-axis points which are arranged behind the second trailing-side representative point along the second axis; and determining the second leading-side outlier candidate and the second trailing-side outlier candidate as a second outlier point, when the number of the outlier candidates satisfies an allowable threshold condition.

According to another embodiment of the present disclosure, there is provided an apparatus of removing a point cloud outlier, the apparatus comprising: a processing and storage unit for arranging a point cloud obtained from a laser scanner in a shape that is placed at least along a first direction; a first point selection unit for selecting, among neighboring first-axis points along a first axis parallel to the first direction, neighboring first-axis points, between which a separation degree satisfies an inspection start threshold condition, as a first leading-side representative point and a first trailing-side representative point; a first outlier clustering unit for selecting a first leading-side outlier candidate and a first trailing-side outlier candidate based on a first leading-side separation degree and a first trailing-side separation degree, the first leading-side separation degree being calculated between neighboring first-axis points among the first leading-side representative point and first-axis points which are arranged in front of the first leading-side representative point along the first axis, the first trailing-side separation degree being calculated between neighboring first-axis points among the first trailing-side representative point and first-axis points which are arranged behind the first trailing-side representative point along the first axis; and a first determination unit for determining the first leading-side outlier candidate and the first trailing-side outlier candidate as a first outlier point, when the number of the outlier candidates satisfies an allowable threshold condition.

According to the present disclosure, a point cloud outlier removal method, which accurately determines an outlier of a point cloud generated near an edge of an object and removes the outlier, and an apparatus implementing the method may be provided.

Effects obtained in the present disclosure are not limited to the above-mentioned effects, and other effects not mentioned above may be clearly understood by those skilled in the art from the following description.

DETAILED DESCRIPTION OF THE INVENTION

Figure 1:
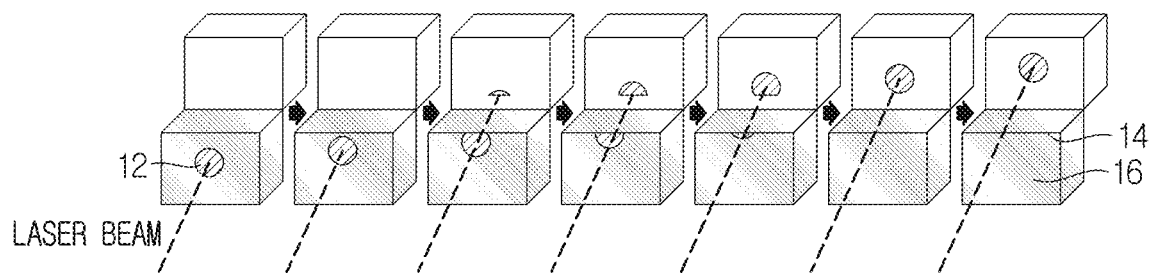
FIG. 1 is a view schematically illustrating a shape of a laser beam of a laser scanner that is irradiated to an object with an edge.
Figure 2:
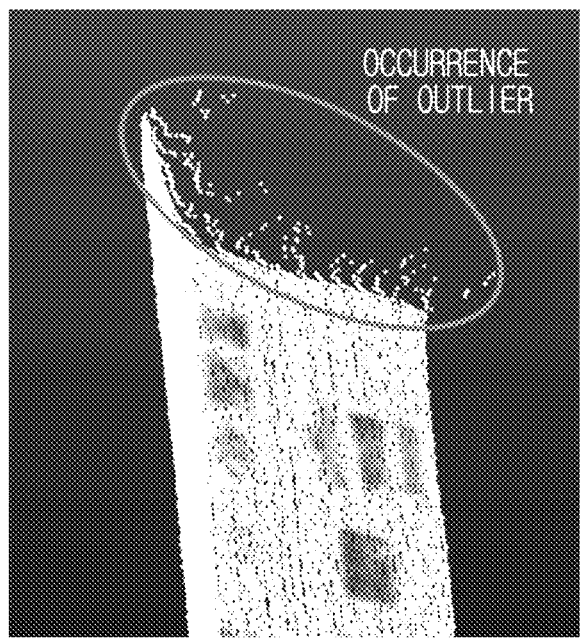
FIG. 2 is a view showing an example outlier occurring in a point cloud.

Hereinafter, exemplary embodiments of the present disclosure will be described in detail with reference to the accompanying drawings so that those skilled in the art may easily implement the present disclosure. However, the present disclosure may be implemented in various different ways, and is not limited to the embodiments described therein.

In describing exemplary embodiments of the present disclosure, well-known functions or constructions will not be described in detail since they may unnecessarily obscure the understanding of the present disclosure. The same constituent elements in the drawings are denoted by the same reference numerals, and a repeated description of the same elements will be omitted.

In the present disclosure, when an element is simply referred to as being "connected to", "coupled to" or "linked to" another element, this may mean that an element is "directly connected to", "directly coupled to" or "directly linked to" another element or is connected to, coupled to or linked to another element with the other element intervening therebetween. In addition, when an element "includes" or "has" another element, this means that one element may further include another element without excluding another component unless specifically stated otherwise.

In the present disclosure, the terms first, second, etc. are only used to distinguish one element from another and do not limit the order or the degree of importance between the elements unless specifically mentioned. Accordingly, a first element in an embodiment could be termed a second element in another embodiment, and, similarly, a second element in an embodiment could be termed a first element in another embodiment, without departing from the scope of the present disclosure.

In the present disclosure, elements that are distinguished from each other are for clearly describing each feature, and do not necessarily mean that the elements are separated. That is, a plurality of elements may be integrated in one hardware or software unit, or one element may be distributed and formed in a plurality of hardware or software units. Therefore, even if not mentioned otherwise, such integrated or distributed embodiments are included in the scope of the present disclosure.

In the present disclosure, elements described in various embodiments do not necessarily mean essential elements, and some of them may be optional elements. Therefore, an embodiment composed of a subset of elements described in an embodiment is also included in the scope of the present disclosure. In addition, embodiments including other elements in addition to the elements described in the various embodiments are also included in the scope of the present disclosure.

The advantages and features of the present invention and the way of attaining them will become apparent with reference to embodiments described below in detail in conjunction with the accompanying drawings. Embodiments, however, may be embodied in many different forms and should not be constructed as being limited to example embodiments set forth herein. Rather, these embodiments are provided so that this disclosure will be complete and will fully convey the scope of the invention to those skilled in the art.

Hereinafter, embodiments of the present disclosure will be described with reference to the accompanying drawings.

Figure 3:
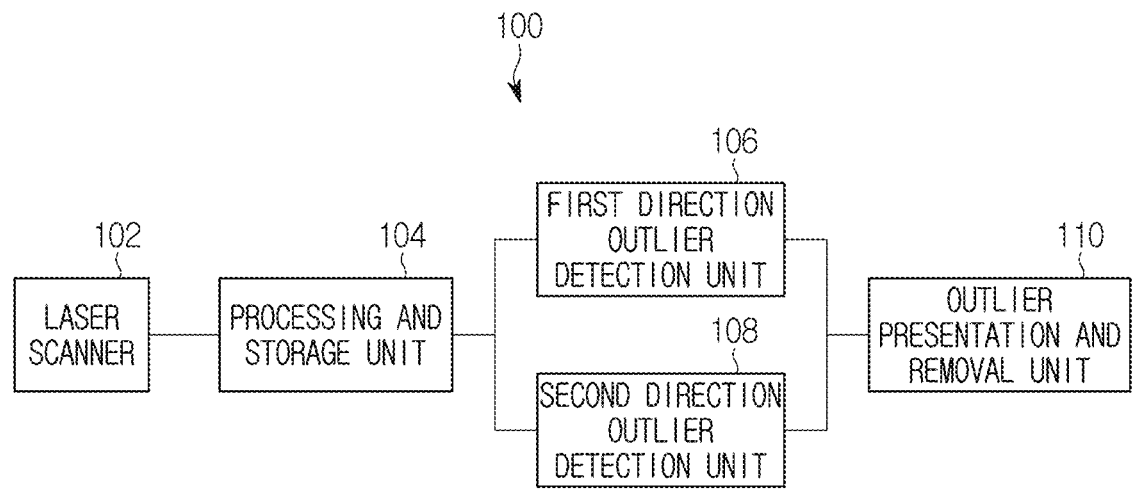
FIG. 3 is a block diagram showing a point cloud outlier removal apparatus according to an embodiment of the present disclosure.
Figure 4:
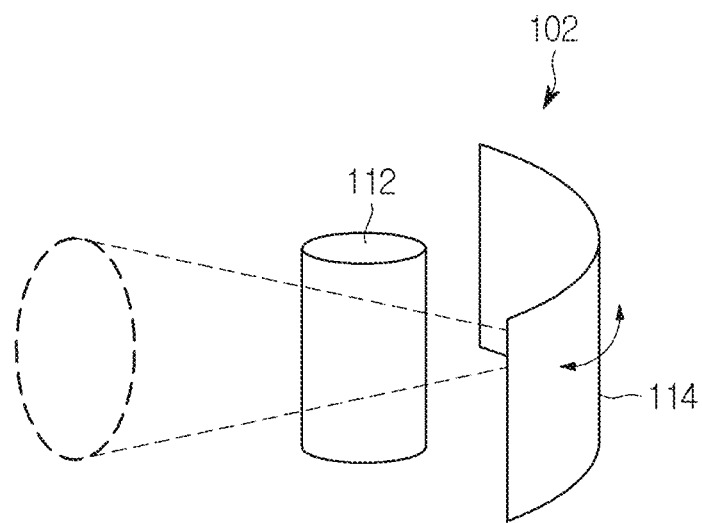
FIG. 4 is a schematic view of a laser scanner.
Figure 5:
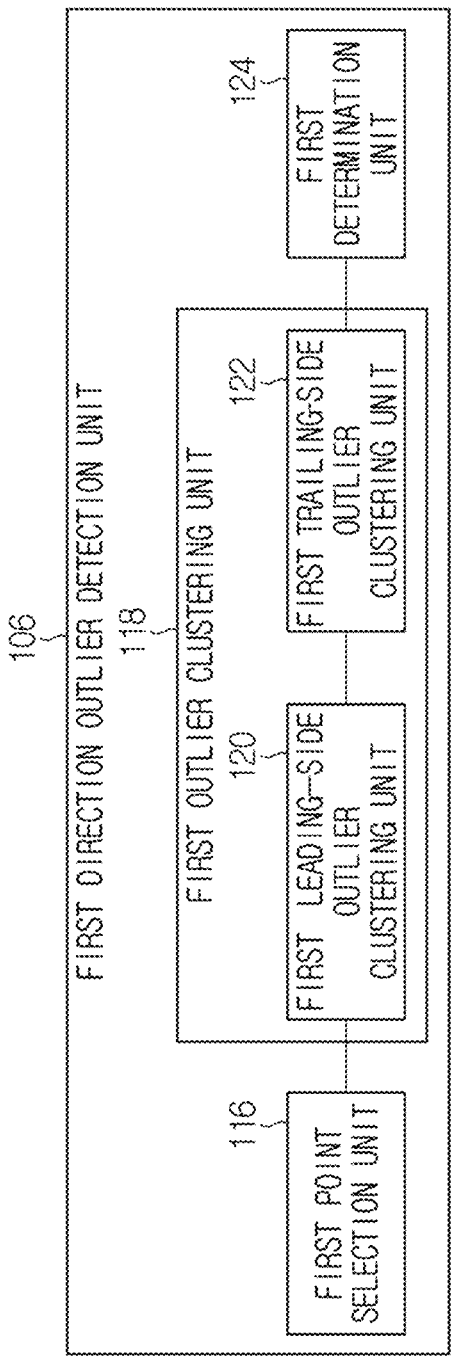
FIG. 5 is a block diagram showing a first direction outlier detecting unit.

Referring to FIGS. 3 to 5, a point cloud outlier removal apparatus according to an embodiment of the present disclosure will be described.

FIG. 3 is a block diagram showing a point cloud outlier removal apparatus according to an embodiment of the present disclosure. FIG. 4 is a schematic view of a laser scanner, and FIG. 5 is a block diagram showing a first direction outlier detection unit.

A point cloud outlier removal apparatus 100 may include a laser scanner 102, a processing and storage unit 104, a first direction outlier detection unit 106, a second direction outlier detection unit 108, and an outlier presentation and removal unit 110.

The laser scanner may generate two-dimensional or three-dimensional spatial information for a point cloud that is obtained by irradiating a laser beam to an object. A laser scanner generating two-dimensional spatial information generates plane spatial information of a first direction, that is, horizontal direction composed of a two-dimensional coordinate. In this case, the second direction outlier detection unit 108 may be omitted. A laser scanner generating three-dimensional spatial information generates stereoscopic spatial information composed of a three-dimensional coordinate in first and second directions. This embodiment describes mainly the 3D laser scanner 102. However, outlier detection using a 2D laser scanner may be implemented through the functions of the processing and storage unit 104, the first direction outlier detection unit 106 and the outlier presentation and removal unit 110, which will be described below.

As illustrated in FIG. 4, the 3D laser scanner 102 may include an emitting unit 112 for transmitting a laser beam, a first mirror 114 rotating for irradiating and reflecting a laser beam to every neighboring object according to a first direction, a second mirror (not illustrated) rotating for reflecting a laser beam in a second direction different from a first direction, that is, in a direction vertical to a first direction, and a light reception unit (not illustrated) for receiving a laser beam reflected from an object. The laser scanner 102 may calculate a distance by measuring time and/or phase of a received laser beam.

The processing and storage unit 104 processes a point cloud obtained from the laser scanner 102 in order to arrange the point cloud in a form of coordinate information configured along first and second directions. A point cloud arranged along a first direction has coordinate information of point cloud arranged in the first direction in each of a plurality of layers consisting of coordinates between a start point and an end point of coordinate information according to a second direction. A point cloud arranged along a second direction has coordinate information of point cloud arranged in the second direction in each of a plurality of layers consisting of coordinates between a start point and an end point of coordinate information according to a first direction.

Referring to FIG. 5, the first direction outlier detection unit 106 includes a first point selection unit 116, a first outlier clustering unit 118 and a first determination unit 124.

Among first-axis points that are neighboring along a first axis parallel to a first direction, the first point selection unit 116 selects neighboring first-axis points, the separation degree between which satisfies an inspection start threshold condition, as a first leading-side representative point and a first trailing-side representative point.

The first outlier clustering unit 118 calculates a first leading-side separation degree between a first leading-side representative point and neighboring first-axis points among first-axis points that are arranged in front of the first leading-side representative point along a first axis. The first outlier clustering unit 118 calculates a first trailing-side separation degree between a first trailing-side representative point and neighboring first-axis points among first-axis points that are arranged behind the first trailing-side representative point along the first axis. The first outlier clustering unit 118 selects a first leading-side outlier candidate and a first trailing-side outlier candidate based on a first leading-side separation degree and a first trailing-side separation degree.

When the number of first leading-side and first trailing-side outlier candidates satisfies an allowable threshold condition, the first determination unit 124 determines a first leading-side outlier candidate and a first trailing-side outlier candidate as a first outlier point.

Similar to FIG. 5, the second direction outlier detection unit 108 may also include a second point selection unit, a second outlier clustering unit, and a second determination unit. Similar to FIG. 5, the second outlier clustering unit may include a second leading-side outlier clustering unit and a second trailing-side outlier clustering unit. In this case, a first axis and a first-axis point in the first direction outlier detection unit 106 are changed to a second axis parallel to a second direction and a second-axis point and are applied to each component of the second direction outlier detection unit 108.

The first- and second-point selection units, the first and second outlier clustering units and the first and second determination units will be described in detail below.

As the outlier presentation and removal unit 110 presents an outlier, which is determined in the first and second direction outlier detection unit 108, in a display form to a user, the outlier may be removed by the user's manipulation or according to automatic setting.

Hereinafter, referring to FIGS. 3 to 20, a point cloud outlier removal method according to other embodiments of the present disclosure will be described. The removal method may be implemented the point cloud outlier apparatus 100. In the embodiment below, for illustration, the laser scanner 102 will be described to obtain and generate three-dimensional spatial information. However, when the laser scanner 102 obtains plane spatial information by generating two-dimensional spatial information, the step S605 in FIG. 6 arranges a point cloud only according to a first direction, and the step S615 is skipped. In addition, according to an embodiment of FIGS. 7 to 15, a point cloud outlier removal method is implemented.

Figure 6:
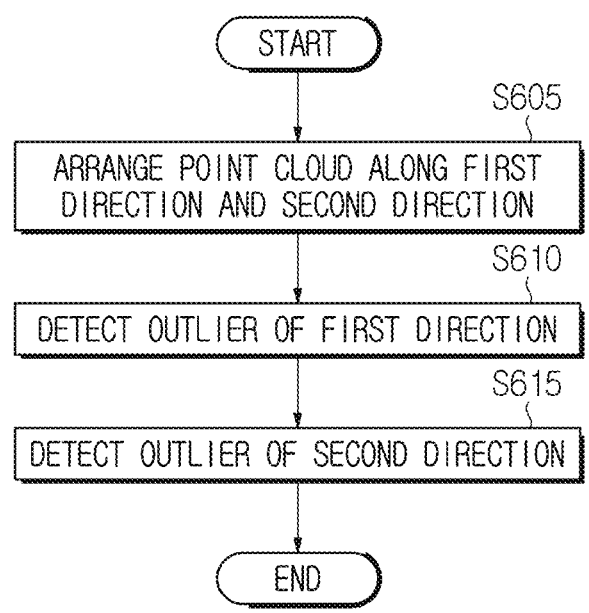
FIG. 6 is a flowchart concerning a point cloud outlier removal method according to another embodiment of the present disclosure.

FIG. 6 is a flowchart concerning a point cloud outlier removal method according to another embodiment of the present disclosure.

First, the processing and storage unit 104 processes and stores a point cloud obtained from the laser scanner 102 in order to arrange the point cloud in a form of coordinate information configured along first and second directions (S605).

As a horizontal direction configured by two-dimensional coordinates, a first direction may be a direction where the laser scanner and an object face each other. A second direction vertical to the first direction may be a height direction of object.

A point cloud arranged along a first direction has coordinate information of point cloud arranged in the first direction in each of a plurality of layers consisting of coordinates between a start point and an end point of coordinate information according to a second direction. A point cloud arranged along a second direction has coordinate information of point cloud arranged in the second direction in each of a plurality of layers consisting of coordinates between a start point and an end point of coordinate information according to a first direction.

Next, when a point cloud according to a second direction has a plurality of layers, the first direction outlier detection unit 106 determines and detects an outlier in a first direction in each layer (S610). A detailed process for this will be described through FIGS. 7 to 10.

Next, when a point cloud according to a first direction has a plurality of layers, the second direction outlier detection unit 108 determines and detects an outlier in a second direction in each layer (S615). A detailed process for this will be described through FIGS. 16 to 19.

This embodiment illustrates that an outlier of a second direction is detected after an outlier of a first direction is detected. However, the present disclosure is not limited thereto. Outliers of first and second directions may be detected at the same time. The present description mainly focuses on a case where an outlier of a second direction is detected after an outlier of a first direction is detected.

Figure 7:
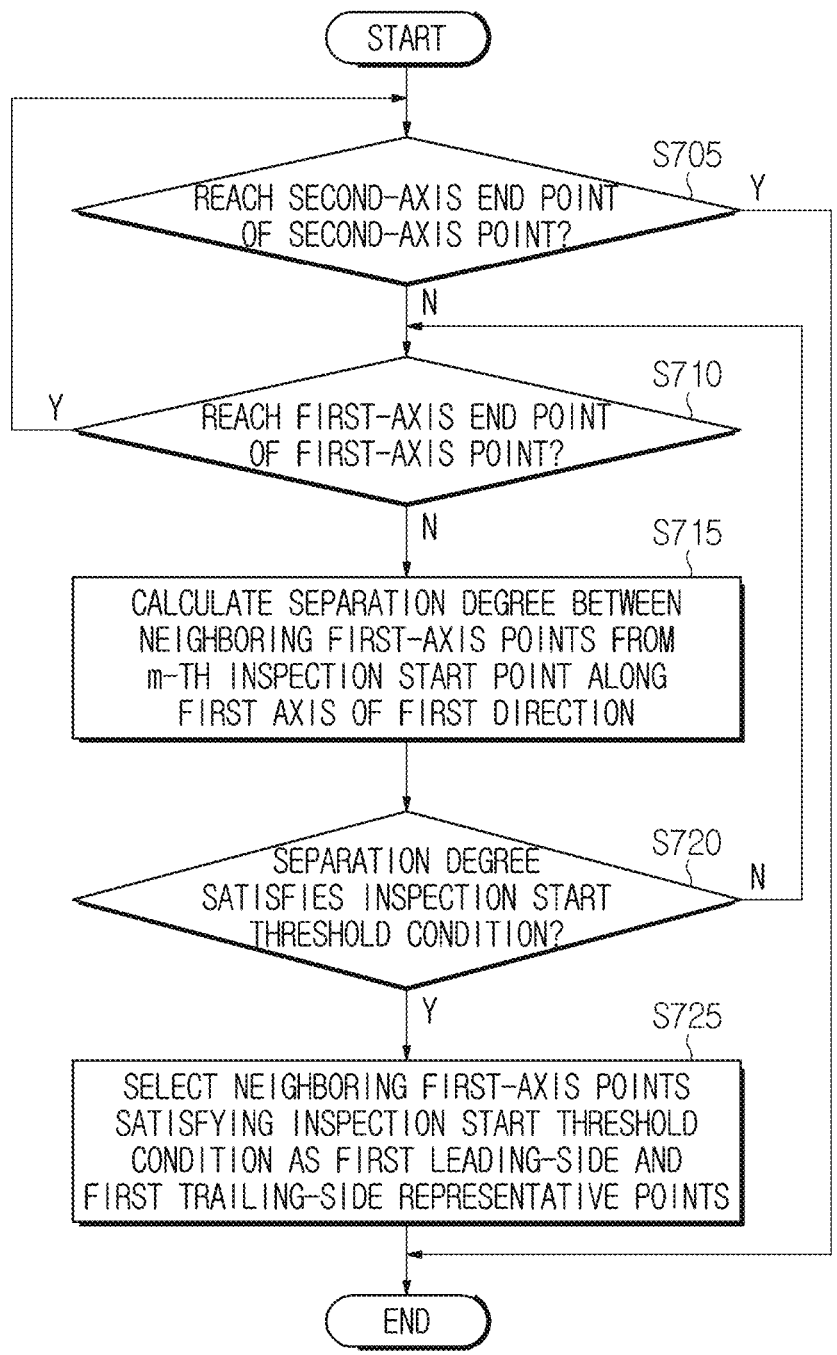
FIG. 7 is a flowchart showing an operation flow of a first point selection unit.
Figure 11:
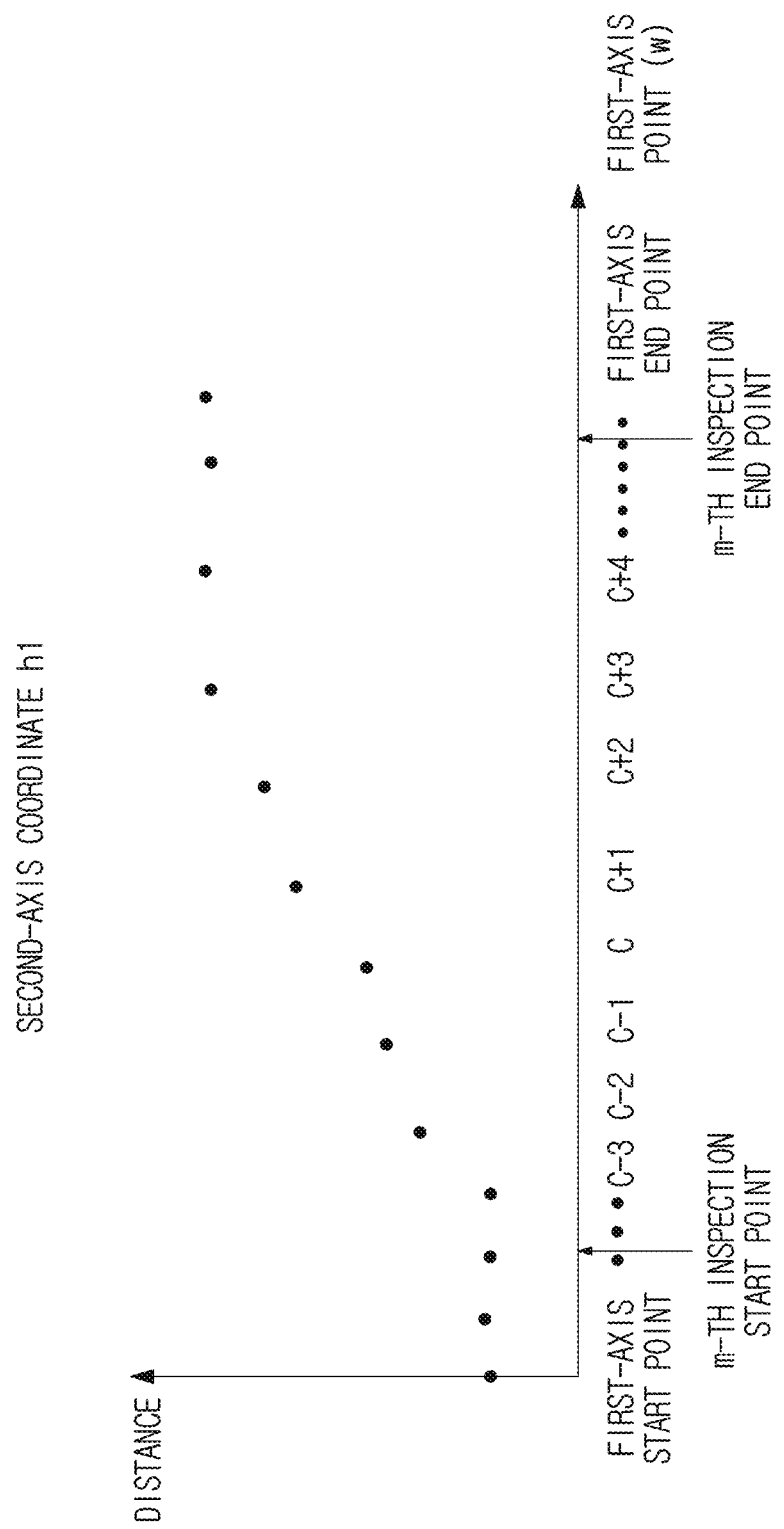
FIG. 11 is a view illustrating an arrangement shape of point cloud at a specific coordinate of a second direction along a first direction.
Figure 12:
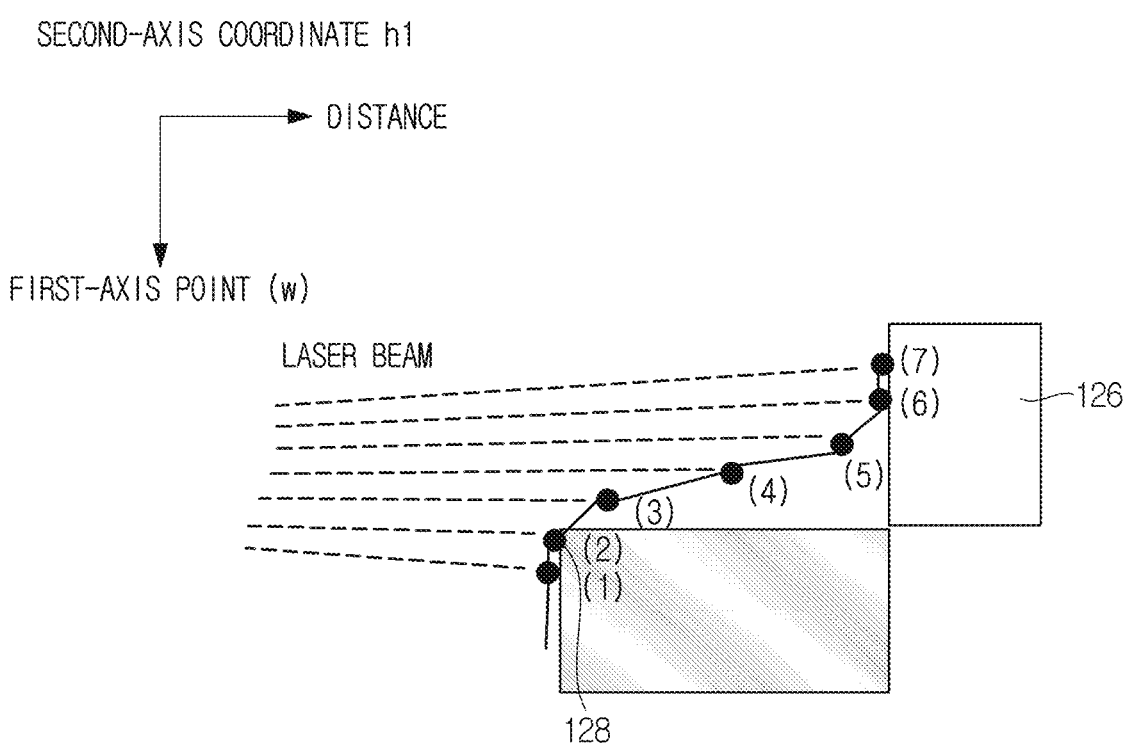
FIG. 12 is a view showing a relative position between a point cloud arranged along a first direction and an object.

Concerning the determination and detection of an outlier in the first direction outlier detection unit 106, which corresponds to step S610, referring to FIG. 7, the first point selection unit 116 extracts an arrangement of point cloud according to a first direction that is associated with a layer corresponding to a start point of a second axis parallel to a second direction. As shown in FIG. 11 and FIG. 12, an arrangement according to a first direction may be expressed as a distance between the laser scanner 102 and a first-axis point (w) placed at a second-axis coordinate (hl) along a first axis parallel to the first direction or as a spatial arrangement of coordinates of the first-axis point (w). As shown in FIG. 12, the distance is a distance from a transmitting point of a laser beam in the laser scanner 102 to an object 126 and is calculated by the laser scanner 102. When hl is assumed to be a start point of a second axis, an arrangement according to a first direction is an arrangement at the start point of the second axis.

When the outlier determination and detection for an arrangement of a first direction is not implemented up to a layer corresponding to a second-axis end point of a second-axis point (N of S705), the first point selection unit 116 enters the step S710. When the outlier determination and detection for an arrangement of a first direction is implemented up to a layer corresponding to a second-axis end point of a second-axis point (Y of S705), the outlier detection of the first direction ends.

Next, when the first point selection unit 116 does not complete a process of selecting a first leading-side representative point and a first trailing-side representative point up to an end point of a first axis (N of S710), it enters the step S715. When the first point selection unit 116 completes the process of selecting a representative point (Y of S710), it returns to the step S705.

Next, the first point selection unit 116 calculates a separation degree between a first inspection start point of a first axis illustrated in FIG. 11 and a first-axis point adjacent in a direction towards an end point of the first axis (i.e., behind) along the first axis of a first direction (S715).

The first inspection start point of the first axis is a point where a point cloud exists and may be a start point of the first axis in some case. The m-th inspection start point illustrated in FIG. 11 corresponds to the first inspection start point in the above-described case.

Figure 13:
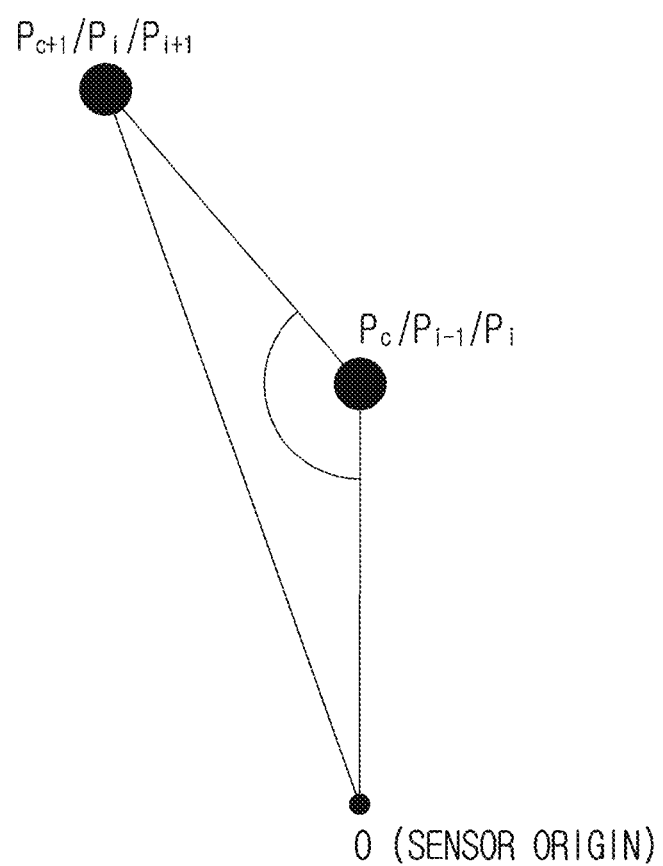
FIG. 13 is a view showing a process of calculating a separation degree, a leading-side separation degree and a trailing-side separation degree.

In addition, a separation degree is a distance between neighboring first-axis points (i.e., C and C+1) or an angle between neighboring first-axis points (C and C+1) and a laser scanner. As shown in FIG. 13, a point ($P_c$) placed in front between first-axis points ($P_c$ and $P_{c+1}$) that are adjacent in the first axis is employed as a central point. As shown in FIG. 11 and FIG. 13, the front point (C), viewed in the direction from a first-axis start point to a first-axis end point, is closer to the first-axis start point than the other point (C+1). When a separation degree is calculated as an angle, it may be calculated by a trigonometrical function. In the description below, a separation degree, a leading-side separation degree and a trailing-side separation degree are calculated based on angle. However, this does not exclude any other embodiment in which a distance is utilized to calculate a separation degree.

Next, the first point selection unit 116 determines whether or not a separation degree satisfies an inspection start threshold condition (S720).

When a separation degree is based on an angle, an inspection start threshold condition is specified as a condition that a separation degree is larger than a predetermined start angle or smaller than a supplementary angle of the start angle. A start angle may be set to be larger than the supplementary angle. For example, the start angle may be set to 170 degrees and the supplementary angle may be set to 10 degrees.

When a separation degree is based on distance, an inspection start threshold condition may be specified as a condition that a separation degree is larger than a predetermined start distance.

When a determination result is that a separation degree satisfies an inspection start threshold condition (Y of S720), the first point selection unit 116 selects neighboring points satisfying the inspection start threshold condition as a first leading-side representative point and a first trailing-side representative point (S725).

Figure 8:
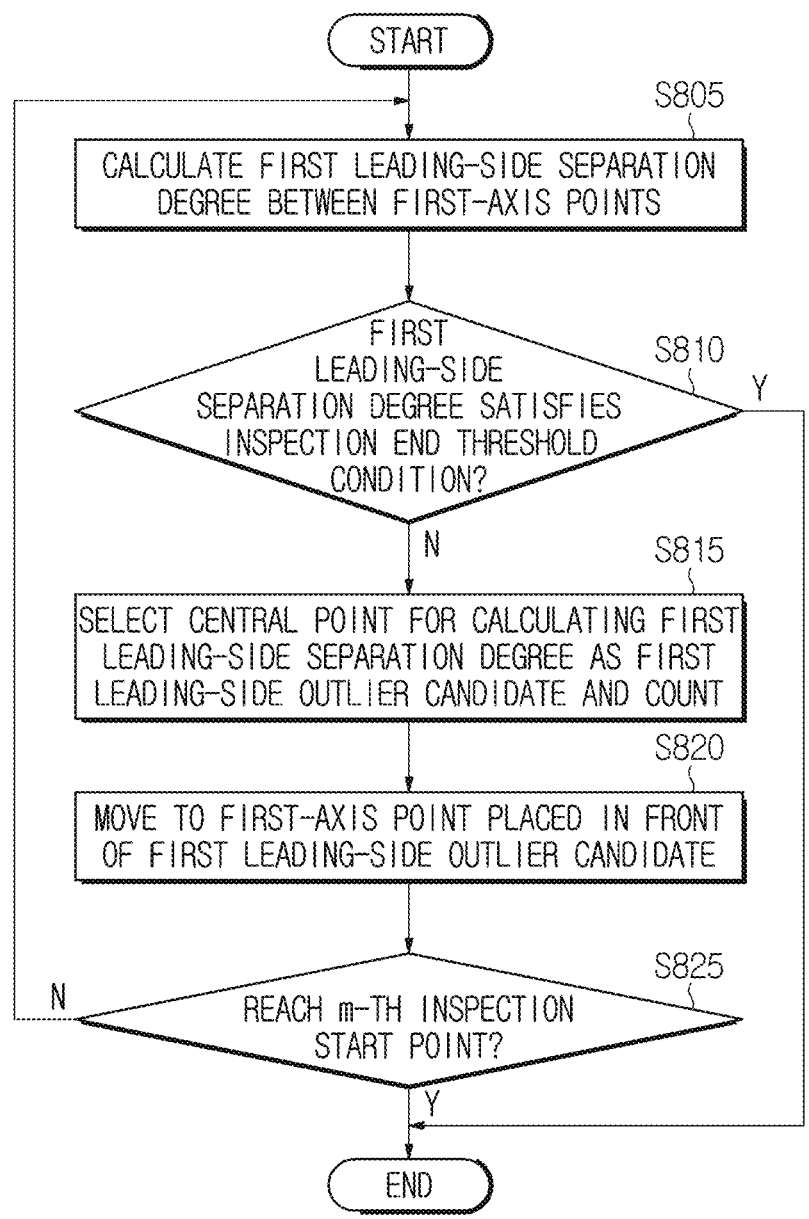
FIG. 8 is a flowchart showing an operation flow of a first leading-side outlier clustering unit.

After the process of FIG. 7 is completed by selecting the first leading-side and trailing-side representative points, the steps of FIG. 8 are implemented in the first outlier clustering unit 118.

Otherwise, when a separation degree does not satisfy an inspection start threshold condition (N of S720), the first point selection unit 116 proceeds to the step S710 and moves to neighboring first-axis points that are arranged behind a first inspection start point. Next, the first point selection unit 116 repeats the steps S715 to S725 for neighboring first-axis points that are selected after moving.

FIG. 11 illustrates that the first-axis points C and C+1 separated from a first inspection start point of a first axis are selected as first leading-side and first trailing-side representative points to correspond to a position of edge in FIG. 12. That is, the first point selection unit 116 calculates each separation degree between neighboring first-axis points in sequence while moving from an inspection start point of a first axis towards the rear of the first axis and selects neighboring first-axis points, which first satisfy an inspection start threshold condition in each of the calculated separation degrees, a first leading-side representative point and a first trailing-side representative point.

Figure 10:
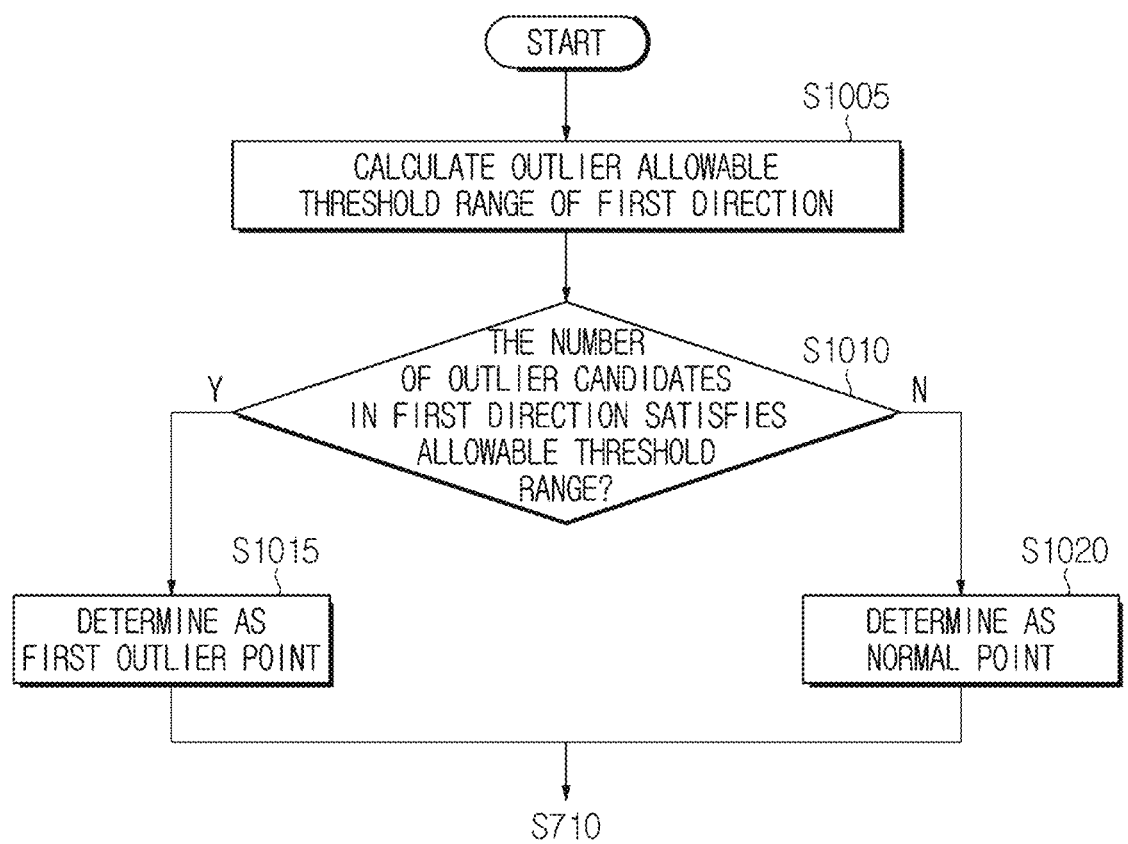
FIG. 10 is a flowchart showing an operation flow of a first determination unit.

Meanwhile, as shown in FIG. 10, when the step S710 is implemented again, if the determination and detection of outlier for an arrangement of a first direction does not arrive at the end point of the first axis in FIG. 11, that is, in the case of N of S710, the steps S715 to S725 may be repeated. Specifically, after the process of determining a first outlier point in FIG. 10, that is, the steps S1015 and S1020 for determining a first outlier point or a normal point are completed, the first point selection unit 116 proceeds to the step S710 again and employs a first-axis point as a next inspection start point, which is placed behind an outlier candidate that is placed at the hindmost position among first leading-side and first trailing-side outlier candidates for which it is determined whether or not an allowable threshold condition is satisfied. The m-th inspection start point illustrated in FIG. 11 corresponds to the next inspection start point that is described above. According to the steps S715 to S725, the first point selection unit 116 calculates a separation degree in sequence from a first-axis point, which is employed as a next inspection start point, towards the rear of the first axis and selects a new first leading-side representative point and a new first trailing-side representative point.

Referring to FIG. 8, a first leading-side outlier clustering unit 120 of the first outlier clustering unit 118 calculates a first leading-side separation degree between a first leading-side representative point (for example, C of FIG. 11) and a point (for example, C−1 of FIG. 11) arranged in front of the first leading-side representative point along a first axis (S805).

The first leading-side separation degree is a distance between neighboring first-axis points (i.e., C and C−1) or an angle between neighboring first-axis points (C and C−1) and the laser scanner 102. As shown in FIG. 13, a point ($P_{i-1}$) placed in front between first-axis points ($P_i$ and $P_{i-1}$) that are adjacent in the first axis is employed as a central point.

Next, the first leading-side outlier clustering unit 120 determines whether or not the first leading-side separation degree satisfies an inspection end threshold condition (S810).

When a first leading-side separation degree is based on an angle, an inspection end threshold condition is specified as a condition that a first leading-side separation degree is smaller than a predetermined end angle or larger than a supplementary angle of the end angle. An end angle may be set to be larger than the supplementary angle. An end angle may be 150 degrees and a supplementary angle may be 30 degrees. An end angle may be set to be smaller than a start angle.

When a determination result is that a first leading-side separation degree does not satisfy an inspection end threshold condition (N of S810), the first leading-side outlier clustering unit 120 counts by selecting a central point for calculating the first leading-side separation degree as a first leading-side outlier candidate (S815).

Figure 9:
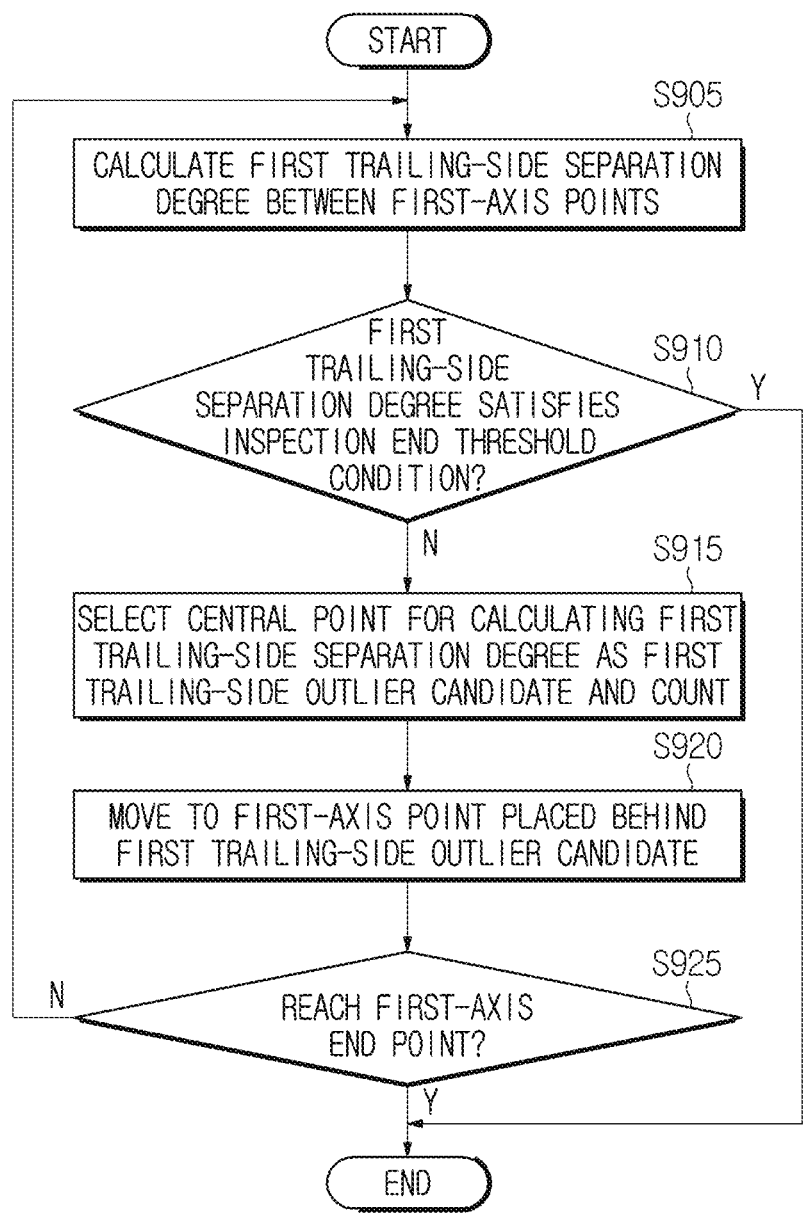
FIG. 9 is a flowchart showing an operation flow of a first trailing-side outlier clustering unit.

Otherwise, when a first leading-side separation degree satisfies an inspection end threshold condition (Y of S810), the first leading-side outlier clustering unit 120 stops calculating a first leading-side separation degree and selecting a first leading-side outlier candidate and shifts to a process of calculating a first trailing-side separation degree and selecting a first trailing-side outlier candidate related to a first trailing-side outlier clustering unit 122, that is, to the process of FIG. 9.

Next, the first leading-side outlier clustering unit 120 moves to a first-axis point that is placed in front of the selected first leading-side outlier candidate (S820).

It is determined whether or not the moved first-axis point reaches a first inspection start point of the first axis (S825). When the moved first-axis point does not reach the first inspection start point (N of S825), the steps S805 to S820 are repeated for the first-axis point and another neighboring first-axis point that is in front of the first-axis point. Otherwise, when the first-axis point reaches the first inspection start point (Y of S825), the first leading-side outlier clustering unit 120 stops calculating a first leading-side separation degree and selecting a first leading-side outlier candidate and shifts to a process of selecting a first trailing-side outlier candidate illustrated in FIG. 9.

Meanwhile, as shown in FIG. 10, when the step S710 is implemented again, if it is not completed, that is, in the case of N of S710, the steps S715 to S725 may be repeated. The first point selection unit 116 enters the step S710 again, employs a next inspection start point, as described above, and according to the steps S715 to S725, adopts a new first leading-side representative point and a new first trailing-side representative point based on a first-axis point that is designated as the next inspection start point. A process of selecting a first leading-side outlier candidate based on a new first leading-side representative point is actually the same as in FIG. 8. In the step S825, the m-th inspection start point of FIG. 11 corresponds to the above-described inspection start point.

Referring to FIG. 9, a first trailing-side outlier clustering unit 122 of the first outlier clustering unit 118 calculates a first trailing-side separation degree between a first trailing-side representative point (i.e., C+1 of FIG. 11) and a point (i.e., C+2 of FIG. 11) arranged behind the first trailing-side representative point along a first axis (S905).

The first trailing-side separation degree is a distance between neighboring first-axis points (i.e., C+1 and C+2) or an angle between neighboring first-axis points (C+1 and C+2) and the laser scanner 102. As shown in FIG. 13, a point ($P_{i+1}$) placed in front between first-axis points ($P_i$ and $P_{i+1}$) that are adjacent in the first axis is employed as a central point.

Next, the first trailing-side outlier clustering unit 122 determines whether or not the first trailing-side separation degree satisfies an inspection end threshold condition (S910).

When a first trailing-side separation degree is based on an angle, an inspection end threshold condition is specified as a condition that a first trailing-side separation degree is smaller than a predetermined end angle or larger than a supplementary angle of the end angle. An end angle may be set to be larger than the supplementary angle. An end angle may be 150 degrees and a supplementary angle may be 30 degrees. An end angle may be set to be smaller than a start angle.

When a determination result is that a first trailing-side separation degree does not satisfy an inspection end threshold condition (N of S910), the first trailing-side outlier clustering unit 122 counts by selecting a central point for calculating the first trailing-side separation degree as a first trailing-side outlier candidate (S915).

Otherwise, when a first trailing-side separation degree satisfies an inspection end threshold condition (Y of S910), the first trailing-side outlier clustering unit 122 stops calculating a first trailing-side separation degree and selecting a first trailing-side outlier candidate and shifts to a process of finally determining a first outlier point for the first leading-side outlier candidate and the first trailing-side outlier candidate, which is related to the first determination unit 124, that is, to the process of FIG. 10.

Next, the first trailing-side outlier clustering unit 122 moves to a first-axis point that is placed behind the selected first trailing-side outlier candidate (S920).

It is determined whether or not the first-axis point reaches an end point of the first axis shown in FIG. 11 (S925). When the first-axis point does not reach the end point of the first axis (N of S925), the steps S905 to S920 are repeated for the first-axis point and another neighboring first-axis point behind the first-axis point. Otherwise, when the first-axis point reaches the end point of the first axis (Y of S925), the first trailing-side outlier clustering unit 122 stops calculating a first trailing-side separation degree and selecting a first trailing-side outlier candidate and shifts to a process of determining a last first outlier point shown in FIG. 10.

In the case of N of S925, a first trailing-side separation degree between subsequent neighboring first-axis points is calculated. When the first trailing-side separation degree of a subsequent first-axis point satisfies an inspection end threshold condition, a first-axis point satisfying the condition corresponds to the m-th inspection end point shown in FIG. 11. Accordingly, a first-axis point that is placed behind the inspection end point of the first axis is adopted as a new inspection start point shown in the step S715 of FIG. 7.

Referring to FIG. 10, the first determination unit 124 calculates an allowable threshold range that is an outlier allowance threshold condition according to a first direction (S1005).

Figure 14:
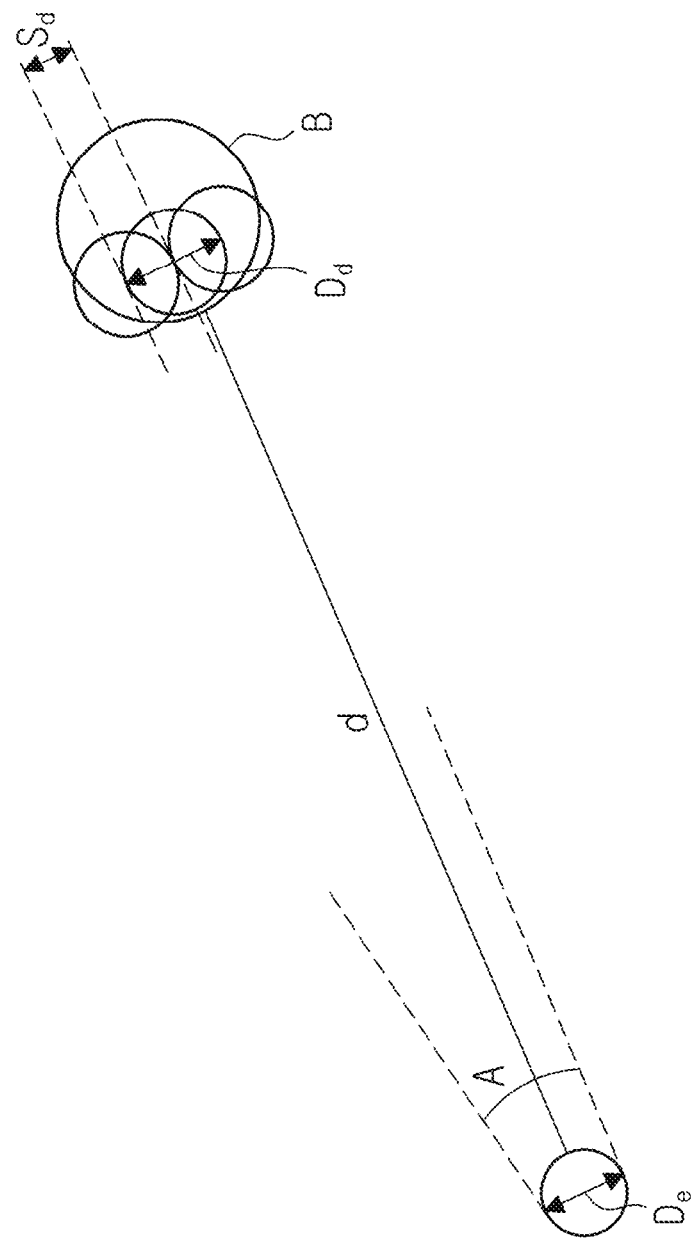
FIG. 14 and FIG. 15 are views illustrating a process of setting an allowable threshold condition.
Figure 15:
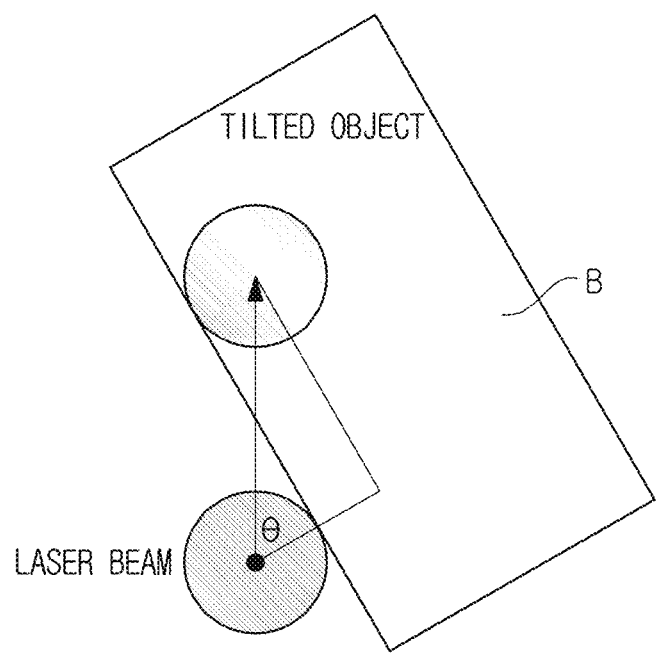

As shown in FIG. 14 and FIG. 15, an allowable threshold range may be set based on a laser beam size (De) at a transmitting point of the laser scanner 102, an emitting angle (A) of laser beam, a measured distance (d) between an object (B), to which a laser beam is irradiated, and a laser scanner, a unit travel distance (Sd) of laser beam at the measured distance (d), and a placement angle (θ) of the object (B) according to a direction in which the laser beam moves.

An allowable threshold range may be obtained by calculating the number of outliers that may be generated at a closest point to the laser scanner 102 among first leading-side and first trailing-side outlier candidates. This may be obtained as follows.

First, a diameter of a laser beam generated at a closest point may be calculated as in Mathematical Formula (1), and the number of outliers may be estimated by dividing the diameter of the laser beam by a unit travel distance. As shown in FIG. 15, since the number of outliers may increase according to the inclination of the object (B), a tilted angle may be added as another element and the number of outliers thus estimated may be calculated as in Mathematical Formula (2). When calculating an estimated minimum number of outliers, θ may be set to 0 degree. θ may be set to 45 degrees by considering the fact that an outlier group is detected in a two-dimensional arrangement in directions of row and column respectively. Θ may be changed according to applications.

$$D_d = D_e + 2d \tan(A/2) \qquad \text{[Mathematical Formula 1]}$$

$D_d$: Diameter of laser beam at distance d
$D_e$: Diameter of laser beam at transmitting point
d: Distance from sensor
A: Divergence angle of laser beam $$C_e = \frac{D_d}{\cos\theta \cdot S_d} \qquad \text{[Mathematical Formula 2]}$$

$C_e$: Number of estimated outliers
θ: Tilted angle of object according to direction where laser beam moves
$S_d$: Unit travel distance of laser beam at distance d Based on number of estimated outliers, an allowable threshold range is set. Considering an error, a threshold of maximum allowable number may be set as in Mathematical Formula (3), and a threshold of minimum allowable number may be set as in Mathematical Formula (4). e1 and e2 are predetermined values that may be designated by a user.

$$T_{max} = C_e + e_1 \qquad \text{[Mathematical Formula 3]}$$

$T_{max}$: Threshold of maximum allowable number
$e_1$: Allowable error $$T_{min} = C_e - e_2 \qquad \text{[Mathematical Formula 4]}$$

$T_{min}$: Threshold of minimum allowable number
$e_2$: Allowable error

Next, the first determination unit 124 determines whether or not the number of first leading-side and first trailing-side outlier candidates of a first direction satisfies an allowable threshold range (S1010).

When the determination result is that the allowable threshold range is satisfied, the first determination unit 124 finally determines an outlier candidate as a first outlier point (S1015). Otherwise, the first determination unit 124 determines an outlier candidate as a normal point (S1020).

When the first determination unit 124 completes determination, the step S710 is implemented to confirm whether or not a last first-axis point of a first outlier point is an end point of the first axis shown in FIG. 11.

Meanwhile, in the step S705 of FIG. 7, when all the processes from FIGS. 7 to 10 are completed for all the layers according to a second direction, the step S615 starts for detecting a second outlier according to the second direction outlier detection unit 108.

Figure 16:
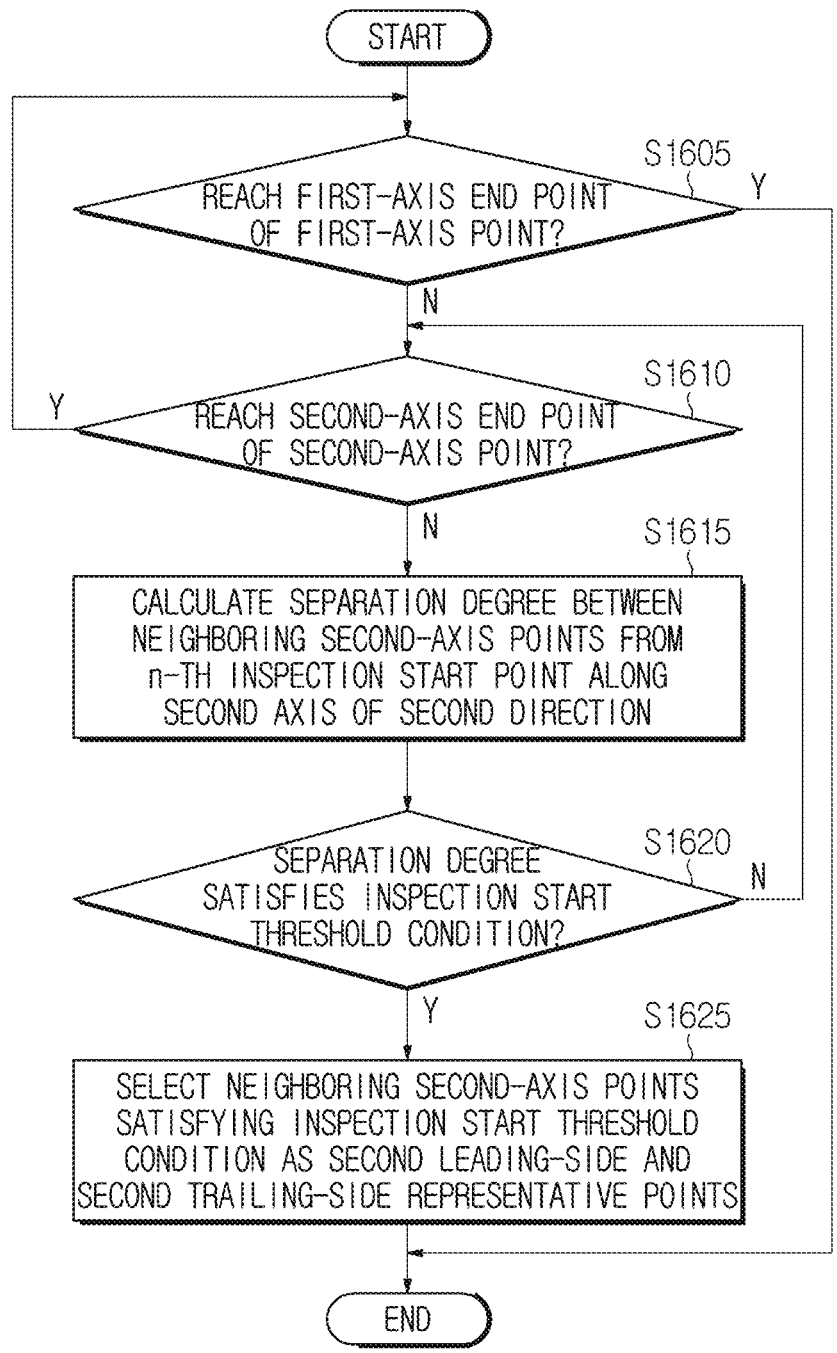
FIGS. 16 to 19 are flowcharts showing an operation flow for the outlier detection in a second direction illustrated in FIG. 6.
Figure 20:
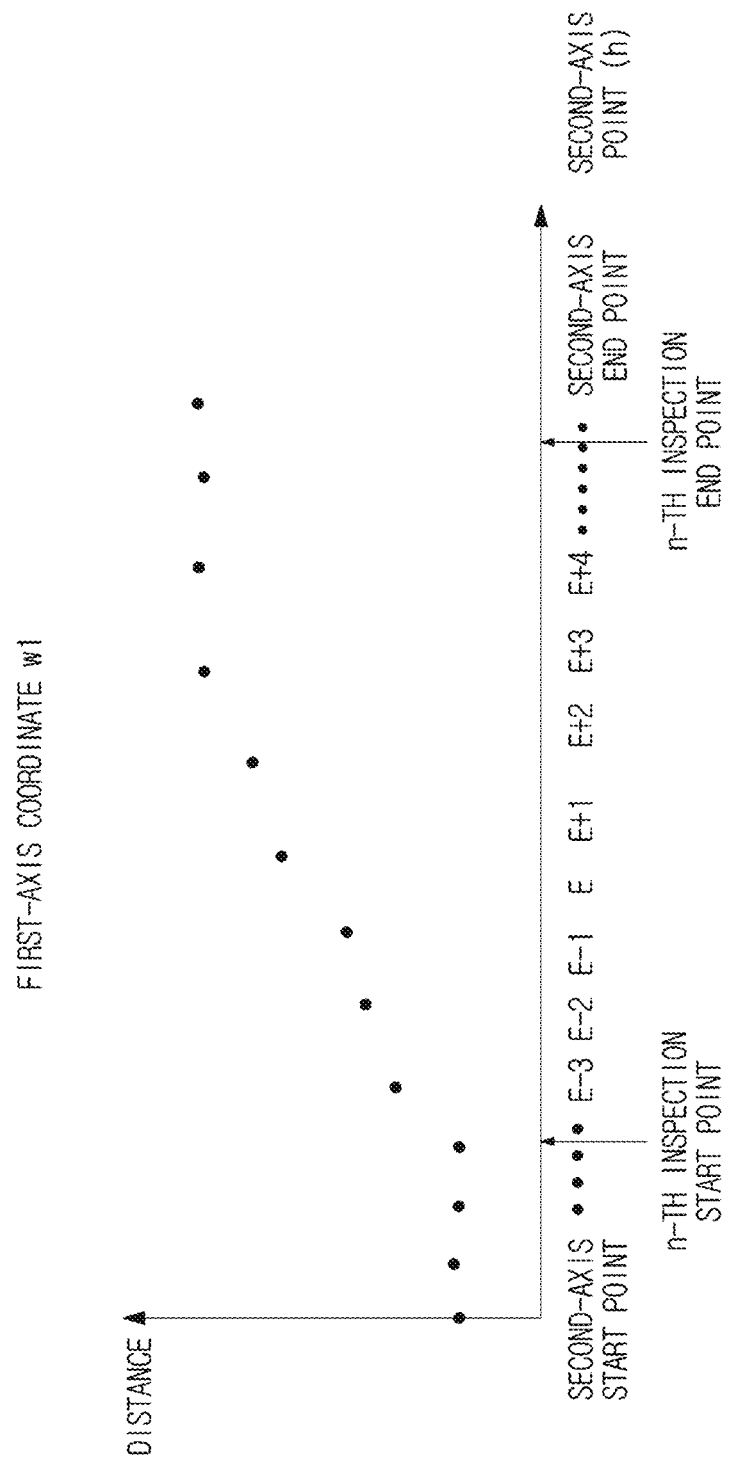
FIG. 20 is a view illustrating an arrangement shape of point cloud at a specific coordinate of a first direction along a second direction.

Concerning the determination and detection of an outlier in the second direction outlier detection unit 108, which corresponds to the step S615, referring to FIG. 16, the second point selection unit extracts an arrangement of point cloud according to a second direction that is associated with a layer corresponding to a start point of a first axis parallel to a first direction. As shown in FIG. 20, an arrangement according to a second direction may be expressed as a distance between the laser scanner 102 and a second-axis point (h) placed at a first-axis coordinate (w1) along a second axis parallel to the second direction or as a spatial arrangement of coordinates of the second-axis point (h).

When the outlier determination and detection for an arrangement of a second direction is not implemented up to a layer corresponding to a first-axis end point of a first-axis point (N of S1605), the second point selection unit enters the step S1610. When the outlier determination and detection for an arrangement of the second direction is implemented up to a layer corresponding to the first-axis end point of the first-axis point (Y of S1605), the outlier detection of the second direction ends.

Next, when the second point selection does not complete a process of selecting a second leading-side representative point and a second trailing-side representative point up to an end point of a second axis shown in FIG. 20 (N of S1610), it enters the step S1615. When the second point selection unit completes the process of selecting a representative point (Y of S1610), it returns to the step S1605.

Next, the second point selection unit calculates a separation degree between a first inspection start point of a second axis illustrated in FIG. 20 and a second-axis point adjacent in a direction towards an end point of the second axis (i.e., behind) along the second axis of a second direction (S1615).

A separation degree is a distance between neighboring second-axis points (for example, E and E+1) or an angle between neighboring second-axis points (E and E+1) and a laser scanner. A point (E) placed in front between second-axis points (E and E+1) that are adjacent in the second axis is employed as a central point. In the description below, a separation degree, a leading-side separation degree and a trailing-side separation degree are calculated based on angle. However, this does not exclude any other embodiment in which a distance is utilized to calculate a separation degree.

Next, the second point selection unit determines whether or not a separation degree satisfies an inspection start threshold condition (S1620).

When a separation degree is based on an angle, an inspection start threshold condition is specified as a condition that a separation degree is larger than a predetermined start angle or smaller than a supplementary angle of the start angle. A start angle may be set to be larger than the supplementary angle. For example, the start angle may be set to 170 degrees and the supplementary angle may be set to 10 degrees.

When a separation degree is based on distance, an inspection start threshold condition may be specified as a condition that a separation degree is larger than a predetermined start distance.

When a determination result is that a separation degree satisfies an inspection start threshold condition (Y of S1620), the second point selection unit selects neighboring points satisfying the inspection start threshold condition as a second leading-side representative point and a second trailing-side representative point (S1625).

Otherwise, when a separation degree does not satisfy an inspection start threshold condition (N of S1620), the second point selection unit proceeds to the step S1610 and moves to neighboring second-axis points that are arranged behind a first inspection start point. Next, the second point selection unit repeats the steps S1615 to S1625 for neighboring second-axis points that are selected after moving.

FIG. 20 illustrates that the second-axis points E and E+1 separated from a start point of a second axis are selected as second leading-side and second trailing-side representative points. That is, the second point selection unit calculates each separation degree between neighboring second-axis points in sequence while moving from a start point of a second axis towards the rear of the second axis and selects neighboring second-axis points, which first satisfy an inspection start threshold condition in each of the calculated separation degrees, a second leading-side representative point and a second trailing-side representative point.

Figure 19:
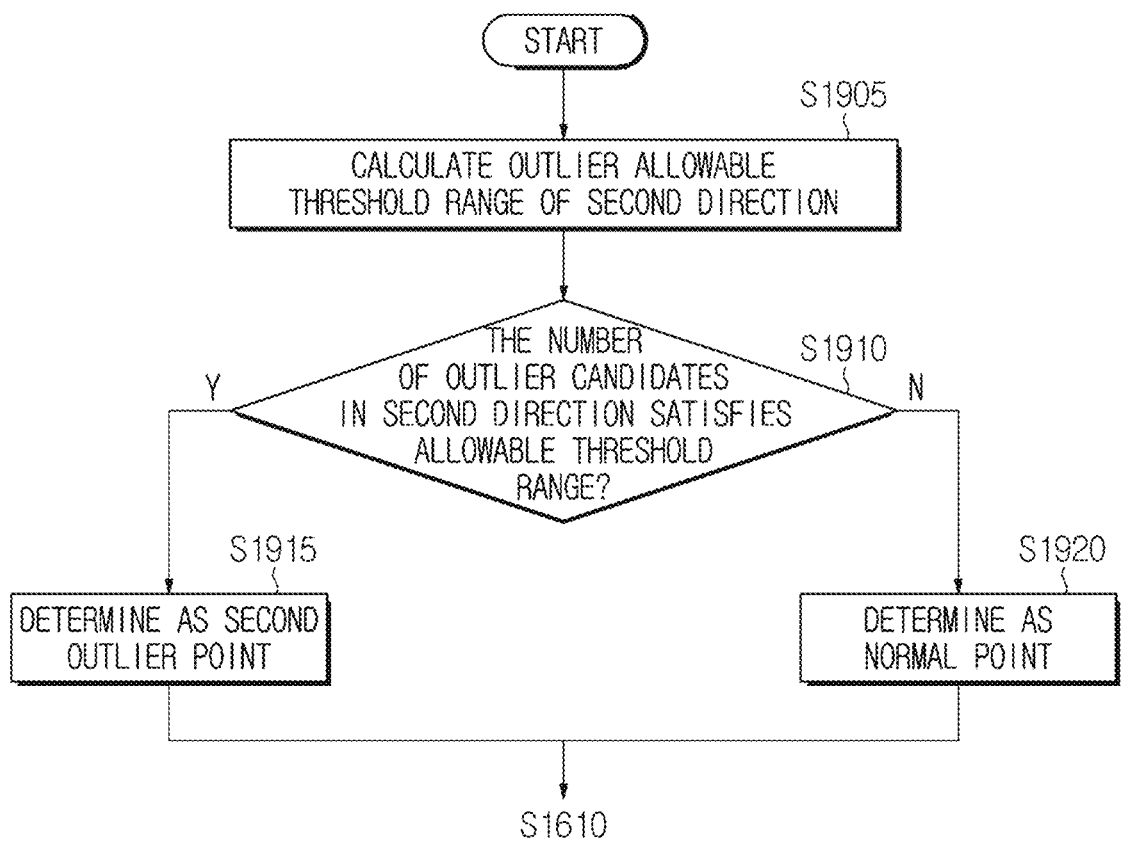

Meanwhile, as shown in FIG. 19, when the step S1610 is implemented again, if the determination and detection of outlier for an arrangement of a second direction does not reach the end point of the second axis in FIG. 20, that is, in the case of N of S1610, the steps S1615 to S1625 may be repeated. Specifically, after the process of determining a second outlier point in FIG. 19, that is, the steps S1915 and S1920 for determining a second outlier point or a normal point are completed, the second point selection unit proceeds to the step S1610 again and employs a second-axis point as a next inspection start point, which is placed behind an outlier candidate that is placed at the hindmost position among second leading-side and second trailing-side outlier candidates for which it is determined whether or not an allowable threshold condition is satisfied. The n-th inspection start point illustrated in FIG. 20 corresponds to the next inspection start point that is described above. According to the steps S1615 to S1625, the second point selection unit calculates a separation degree in sequence from a second-axis point, which is employed as a next inspection start point, towards the rear of the second axis and selects a new second leading-side representative point and a new second trailing-side representative point.

Figure 17:
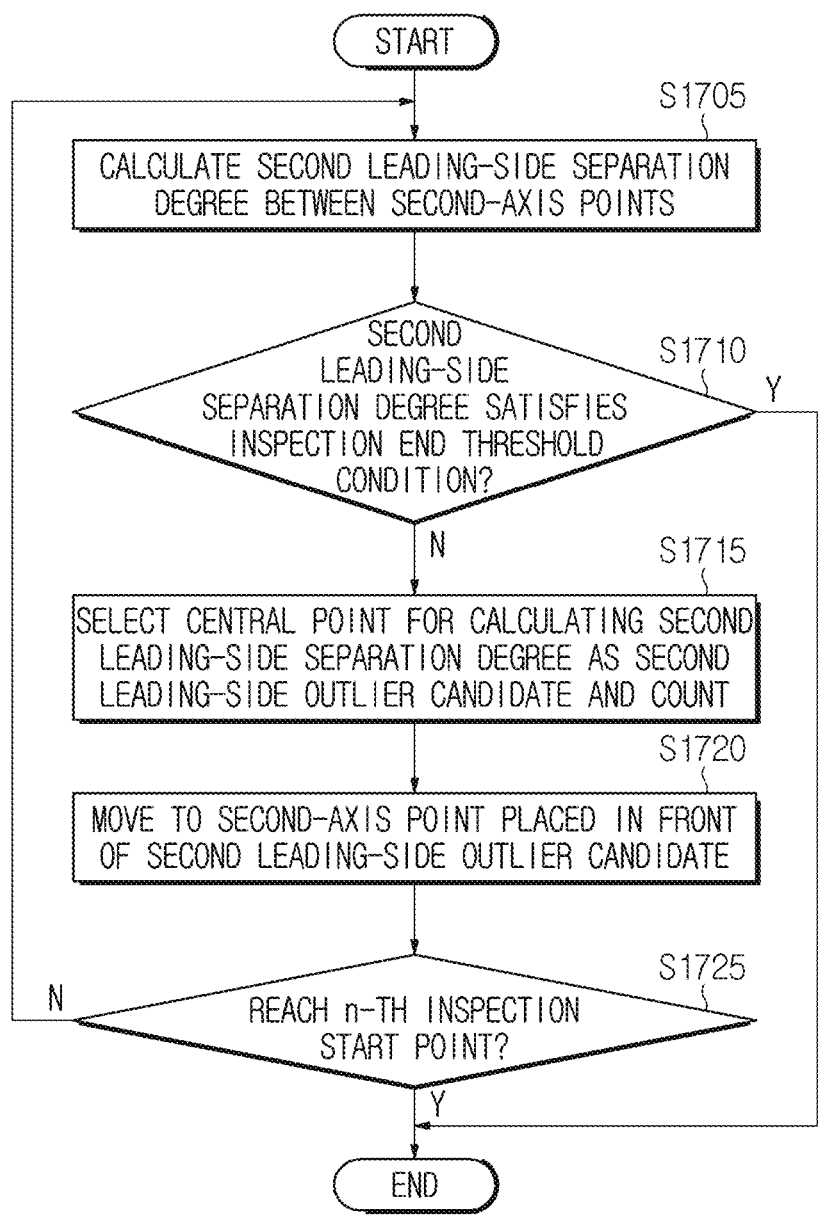

Referring to FIG. 17, a second leading-side outlier clustering unit of the second outlier clustering unit calculates a second leading-side separation degree between a second leading-side representative point (for example, E of FIG. 20) and a point (for example, E−1 of FIG. 20) arranged in front of the second leading-side representative point along a second axis (S1705).

A second leading-side separation degree is a distance between neighboring second-axis points (for example, E and E−1) or an angle between neighboring second-axis points (E and E−1) and the laser scanner 102. In the substantial same way as in FIG. 13, a point placed in front between second-axis points that are adjacent in the second axis is employed as a central point.

Next, the second leading-side outlier clustering unit determines whether or not the second leading-side separation degree satisfies an inspection end threshold condition (S1710).

When a second leading-side separation degree is based on an angle, an inspection end threshold condition is specified as a condition that a second leading-side separation degree is smaller than a predetermined end angle or larger than a supplementary angle of the end angle. An end angle may be set to be larger than the supplementary angle. An end angle may be 150 degrees and a supplementary angle may be 30 degrees. An end angle may be set to be smaller than a start angle.

When a determination result is that a second leading-side separation degree does not satisfy an inspection end threshold condition (N of S1710), the second leading-side outlier clustering unit counts by selecting a central point for calculating the second leading-side separation degree as a second leading-side outlier candidate (S1715).

Figure 18:
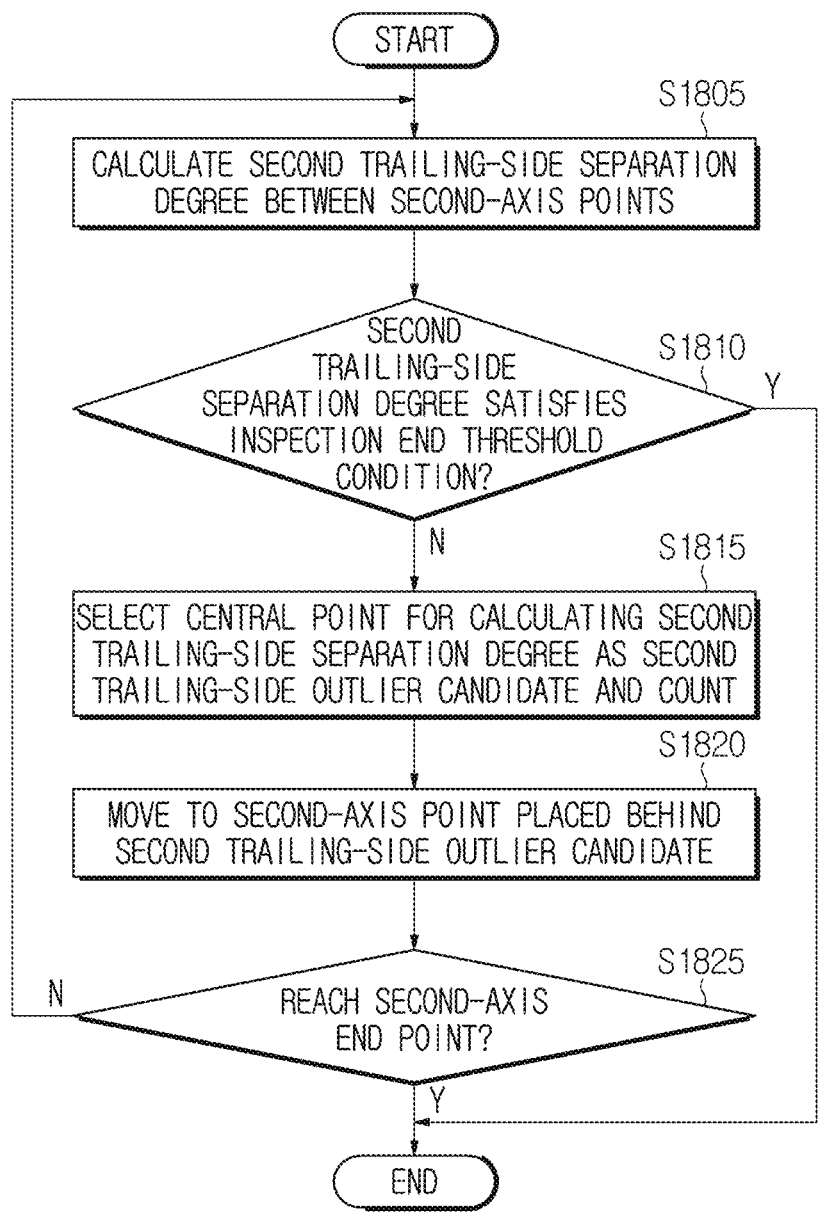

Otherwise, when a second leading-side separation degree satisfies an inspection end threshold condition (Y of S1710), the second leading-side outlier clustering unit stops calculating a second leading-side separation degree and selecting a second leading-side outlier candidate and shifts to a process of calculating a second trailing-side separation degree and selecting a second trailing-side outlier candidate related to a second trailing-side outlier clustering unit, that is, to the process of FIG. 18.

Next, the second leading-side outlier clustering unit moves to a second-axis point that is placed in front of the selected second leading-side outlier candidate (S1720).

It is determined whether or not the second-axis point reaches a first inspection start point of the second axis (S1725). When the second-axis point does not reach the first inspection start point (N of S1725), the steps S1705 to S1720 are repeated for the second-axis point and another neighboring second-axis point that is in front of the second-axis point. Otherwise, when the second-axis point reaches the first inspection start point (Y of S1725), the second leading-side outlier clustering unit stops calculating a second leading-side separation degree and selecting a second leading-side outlier candidate and shifts to a process of selecting a second trailing-side outlier candidate illustrated in FIG. 18.

Meanwhile, as shown in FIG. 19, when the step S1610 is implemented again, if it is not completed, that is, in the case of N of S1610, the steps S1615 to S1625 may be repeated. The second point selection unit enters the step S1610 again, employs a next inspection start point, as described above, and according to the steps S1615 to S1625, adopts a new second leading-side representative point and a new second trailing-side representative point based on a second-axis point that is designated as the next inspection start point. A process of selecting a second leading-side outlier candidate based on a new second leading-side representative point is substantially same as in FIG. 17. In the step S1725, the n-th inspection start point of FIG. 20 corresponds to the above-described inspection start point.

Referring to FIG. 18, a second trailing-side outlier clustering unit of the second outlier clustering unit calculates a second trailing-side separation degree between a second trailing-side representative point (for example, E+1 of FIG. 20) and a point (for example, E+2 of FIG. 20) arranged behind the second trailing-side representative point along a second axis (S1805).

A second trailing-side separation degree is a distance between neighboring second-axis points (i.e., E+1 and E+2) or an angle between neighboring second-axis points (E+1 and E+2) and the laser scanner 102. In the substantial same way as in FIG. 13, a point placed in front between second-axis points that are adjacent in the second axis is employed as a central point.

Next, the second trailing-side outlier clustering unit determines whether or not the second trailing-side separation degree satisfies an inspection end threshold condition (S1810).

When a second trailing-side separation degree is based on an angle, an inspection end threshold condition is specified as a condition that a second trailing-side separation degree is smaller than a predetermined end angle or larger than a supplementary angle of the end angle. An end angle may be set to be larger than the supplementary angle. An end angle may be 150 degrees and a supplementary angle may be 30 degrees. An end angle may be set to be smaller than a start angle.

When a determination result is that a second trailing-side separation degree does not satisfy an inspection end threshold condition (N of S1810), the second trailing-side outlier clustering unit counts by selecting a central point for calculating the second trailing-side separation degree as a second trailing-side outlier candidate (S1815).

Otherwise, when a second trailing-side separation degree satisfies an inspection end threshold condition (Y of S1810), the second trailing-side outlier clustering unit stops calculating a second trailing-side separation degree and selecting a second trailing-side outlier candidate and shifts to whether or not to determine a second outlier for second leading-side and second trailing-side outlier candidates, which is related to the second determination unit, that is, to the process of FIG. 19.

Next, the second trailing-side outlier clustering unit moves to a second-axis point that is placed behind the selected second trailing-side outlier candidate (S1820).

It is determined whether or not the second-axis point reaches an end point of the second axis shown in FIG. 20 (S1825). When the second-axis point does not reach the end point of the second axis (N of S1825), the steps S1805 to S1820 are repeated for the second-axis point and another neighboring second-axis point behind the second-axis point. Otherwise, when the second-axis point reaches the end point of the second axis (Y of S1825), the second trailing-side outlier clustering unit stops calculating a second trailing-side separation degree and selecting a second trailing-side outlier candidate and shifts to a process of determining a last second outlier point shown in FIG. 19.

In the case of N of S1825, a second trailing-side separation degree between subsequent neighboring second-axis points is calculated. When the second trailing-side separation degree of a subsequent second-axis point satisfies an inspection end threshold condition, a second-axis point satisfying the condition corresponds to the n-th inspection end point shown in FIG. 20. Accordingly, a second-axis point that is placed behind the inspection end point of the second axis is adopted as a new inspection start point shown in the step S1615 of FIG. 16.

Referring to FIG. 19, the second determination unit calculates an allowable threshold range that is an outlier allowance threshold condition according to a second direction (S1905).

An allowable threshold range may be set based on a laser beam size (De) at a transmitting point of the laser scanner 102, an emitting angle (A) of laser beam, a measured distance (d) between an object, to which a laser beam is irradiated, and a laser scanner, a unit travel distance (Sd) of laser beam at the measured distance (d), and a placement angle ($\theta$) of the object according to a direction in which the laser beam moves. As this was described in the step S1005 of FIG. 10, no further detailed description is provided.

Next, the second determination unit determines whether or not the number of second leading-side and second trailing-side outlier candidates of a second axis satisfies an allowable threshold range (S1910).

When the determination result is that the allowable threshold range is satisfied, the second determination unit finally determines an outlier candidate as a second outlier point (S1915). Otherwise, the second determination unit determines an outlier candidate as a normal point (S1920).

When the second determination unit completes determination, the step S1610 is implemented to confirm whether or not a last second-axis point of a second outlier point is an end point of the second axis shown in FIG. 20.

According to the present disclosure, when the laser scanner 102 obtains a point cloud while rotating, points with a relatively high density and a small distance variance between neighbors are obtained from a surface not an edge.

When the laser reaches an edge, a distance between neighboring points drastically increases as compared to the points that are not obtained from the edge. This is utilized to remove an outlier. Therefore, an outlier of a point cloud generated near an edge of an object may be accurately determined without error and be removed. In addition, according to this embodiment, in the case of a 3D laser scanner, point clouds of the horizontal and vertical directions may remove an accumulated outlier more effectively.

The technical problems solved by the present disclosure are not limited to the above technical problems and other technical problems which are not described herein will become apparent to those skilled in the art from the above description.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some of the steps.

The various embodiments of the present disclosure are not a list of all possible combinations and are intended to describe representative aspects of the present disclosure, and the matters described in the various embodiments may be applied independently or in combination of two or more.

In addition, various embodiments of the present disclosure may be implemented in hardware, firmware, software, or a combination thereof. In the case of implementing the present invention by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

What is claimed is:

1. A method of removing outlier of point cloud, the method comprising:
arranging a point cloud obtained from a laser scanner in a shape that is placed at least along a first direction;

selecting, among neighboring first-axis points along a first axis parallel to the first direction, neighboring first-axis points, between which a separation degree satisfies an inspection start threshold condition, as a first leading-side representative point and a first trailing-side representative point;

selecting a first leading-side outlier candidate and a first trailing-side outlier candidate based on a first leading-side separation degree and a first trailing-side separation degree, the first leading-side separation degree being calculated between neighboring first-axis points among the first leading-side representative point and first-axis points which are arranged in front of the first leading-side representative point along the first axis, the first trailing-side separation degree being calculated between neighboring first-axis points among the first trailing-side representative point and first-axis points which are arranged behind the first trailing-side representative point along the first axis; and determining the first leading-side outlier candidate and the first trailing-side outlier candidate as a first outlier point, when the number of the outlier candidates satisfies an allowable threshold condition, wherein the separation degree, the first leading-side separation degree and the first trailing-side separation degree are calculated based on a distance between the neighboring first-axis points or, an angle that is measured by employing a point placed in front among the neighboring first-axis points in the first axis as a central point, the angle being an angle between the neighboring first-axis points and the laser scanner, and wherein the inspection start threshold condition is specified as a condition that the separation degree is larger than a predetermined start angle or smaller than a supplementary angle of the start angle, when the separation degree is based on the angle, and the start angle is set to be larger than the supplementary angle.

2. The method of claim 1,
wherein in a case that the first leading-side separation degree and the first trailing-side separation degree are based on the angle,
the selecting of an outlier candidate selects the central point as an outlier candidate when the first leading-side separation degree and the first trailing-side separation degree do not satisfy an inspection end threshold condition, and
the inspection end threshold condition is specified as a condition that the first leading-side separation degree and the first trailing-side separation degree are smaller than a predetermined end angle or larger than a supplementary angle of the end angle, and the end angle is set to be larger than the supplementary angle.

3. The method of claim 2,
wherein the selecting of the outlier candidate stops at the first-axis point corresponding to the inspection end threshold condition, when the first leading-side separation degree and the first trailing-side separation degree satisfy the inspection end threshold condition.

4. The method of claim 1,
wherein the determining as the first outlier point determines the outlier candidates as a normal point, when the number of the outlier candidates does not satisfy an allowable threshold condition.

5. The method of claim 1,
wherein the allowable threshold condition is set based on a size of a laser beam at a transmitting point of the laser scanner, an emitting angle of the laser beam, a measured distance between an object, to which the laser beam is irradiated, and the laser scanner, a unit travel distance of the laser beam at the measured distance and a placement angle of the object according to a direction in which the laser beam moves.

6. The method of claim 1,
wherein the selecting as the first leading-side representative point and the first trailing-side representative point calculates each separation degree between the neighboring first-axis points in sequence by moving from an inspection start point of the first axis towards the rear of the first axis and selecting neighboring first-axis points, which first satisfy the inspection start threshold condition in each calculated separation degree, as the first leading-side representative point and the first trailing-side representative point.

7. The method of claim 6,
wherein the selecting as the first leading-side representative point and the first trailing-side representative point employs a first-axis point placed behind an outlier candidate, which is placed last among the first trailing-side outlier candidates for which, in the determining as the first outlier point, it is determined whether or not an allowable threshold condition is satisfied, as an inspection start point, when the determining as the first outlier point is not implemented up to an end point of the first axis, and
calculates a separation degree in sequence from the first-axis point that is employed as the inspection start point towards the rear of the first axis, and
selects a new first leading-side representative point and a new first trailing-side representative point.

8. The method of claim 7,
wherein the selecting of the first leading-side outlier candidate in the selecting of the outlier candidate calculates a first leading-side separation degree between the neighboring first-axis points by moving in sequence from the new first leading-side representative point towards a front of the first axis, and
wherein the selecting of the first-side outlier candidate stops at the first-axis point corresponding to the inspection end threshold condition, when the first leading-side separation degree satisfies an inspection end threshold condition behind the inspection start point.

9. The method of claim 1,
wherein the laser scanner generates two-dimensional or three-dimensional spatial information.

10. The method of claim 1,
wherein for the first-axis points of each of the plurality of layers in a second direction, the selecting as the first leading-side representative point and the first trailing-side representative point, the selecting of the first leading-side outlier candidate and the first trailing-side outlier candidate and the determining as the first outlier point are repeated, when the laser scanner generates three-dimensional spatial information and the point cloud is generated in a plurality of layers in a second direction different from the first direction.

11. The method of claim 1,
wherein the arranging of the point cloud further generates a shape that is arranged along a second direction different from the first direction when the laser scanner generates three-dimensional spatial information, and further comprises:
selecting, among second-axis points along a second axis parallel to the second direction, neighboring second-axis points, between which a separation degree satisfies an inspection start threshold condition, as a second leading-side representative point and a second trailing-side representative point;

selecting a second leading-side outlier candidate and a second trailing-side outlier candidate based on a second leading-side separation degree and a second trailing-side separation degree, the second leading-side separation degree being calculated between neighboring second-axis points among the second leading-side representative point and second-axis points which are arranged in front of the second leading-side representative point along the second axis, the second trailing-side separation degree being calculated between neighboring second-axis points among the second trailing-side representative point and second-axis points which are arranged behind the second trailing-side representative point along the second axis; and determining the second leading-side outlier candidate and the second trailing-side outlier candidate as a second outlier point, when the number of the outlier candidates satisfies an allowable threshold condition.

12. An apparatus of removing a point cloud outlier, the apparatus comprising:

a processor and a memory for arranging a point cloud obtained from a laser scanner in a shape that is placed at least along a first direction;

a first point selector for selecting, among neighboring first-axis points along a first axis parallel to the first direction, neighboring first-axis points, between which a separation degree satisfies an inspection start threshold condition, as a first leading-side representative point and a first trailing-side representative point;

a first outlier cluster for selecting a first leading-side outlier candidate and a first trailing-side outlier candidate based on a first leading-side separation degree and a first trailing-side separation degree, the first leading-side separation degree being calculated between neighboring first-axis points among the first leading-side representative point and first-axis points which are arranged in front of the first leading-side representative point along the first axis, the first trailing-side separation degree being calculated between neighboring first-axis points among the first trailing-side representative point and first-axis points which are arranged behind the first trailing-side representative point along the first axis; and a first determinator for determining the first leading-side outlier candidate and the first trailing-side outlier candidate as a first outlier point, when the number of the outlier candidates satisfies an allowable threshold condition, wherein the separation degree, the first leading-side separation degree and the first trailing-side separation degree are calculated based on a distance between the neighboring first-axis points or, an angle that is measured by employing a point placed in front among the neighboring first-axis points in the first axis as a central point, the angle being an angle between the neighboring first-axis points and the laser scanner, and wherein the inspection start threshold condition is specified as a condition that the separation degree is larger than a predetermined start angle or smaller than a supplementary angle of the start angle, when the separation degree is based on the angle, and the start angle is set to be larger than the supplementary angle.

13. The apparatus of claim 12, wherein, in a case that the first leading-side separation degree and the first trailing-side separation degree are based on the angle, the first outlier cluster selects the central point as an outlier candidate, when the first leading-side separation degree and the first trailing-side separation degree do not satisfy an inspection end threshold condition, and stops the selecting of an outlier candidate at the first-axis point corresponding to the inspection end threshold condition, when the first leading-side separation degree and the first trailing-side separation degree satisfy the inspection end threshold condition, and wherein the inspection end threshold condition is specified as a condition that the first leading-side separation degree and the first trailing-side separation degree are larger than a predetermined end angle or smaller than a supplementary angle of the end angle, and the end angle is set to be larger than the supplementary angle.

14. The apparatus of claim 12, wherein the first determinator determines the outlier candidates as a normal point, when the number of the outlier candidates does not satisfy an allowable threshold condition.

15. The apparatus of claim 12, wherein the allowable threshold condition is set based on a size of a laser beam at a transmitting point of the laser scanner, an emitting angle of the laser beam, a measured distance between an object, to which the laser beam is irradiated, and the laser scanner, a unit travel distance of the laser beam at the measured distance; and a placement angle of the object according to a direction in which the laser beam moves.

16. The apparatus of claim 12, wherein the first point selector calculates each separation degree between the neighboring first-axis points by moving in sequence from the inspection start point of the first axis towards a rear of the first axis and selects neighboring first-axis points, which first satisfy the inspection start threshold condition in each calculated separation degree, as the first leading-side representative point and the first trailing-side representative point, and wherein the first point selector employs a first-axis point placed behind an outlier candidate, which is placed last among the first leading-side and trailing-side outlier candidates for which the first determinator determines whether or not an allowable threshold condition is satisfied, and calculates a separation degree in sequence from the first-axis point that is employed as the inspection start point towards the rear of the first axis, and selects a new first leading-side representative point and a new first trailing-side representative point.

* * * * *